(12) United States Patent
Spielman

(10) Patent No.: US 11,730,188 B2
(45) Date of Patent: Aug. 22, 2023

(54) TOBACCO GRINDING, SORTING, AND/OR LOADING DEVICE

(71) Applicant: ZES Products, LLC, Orange, VA (US)

(72) Inventor: Zachary Elliott Spielman, Keswick, VA (US)

( * ) Notice: Subject to any disclaimer, the term of this patent is extended or adjusted under 35 U.S.C. 154(b) by 342 days.

(21) Appl. No.: 16/857,151

(22) Filed: Apr. 23, 2020

(65) Prior Publication Data

US 2021/0100277 A1    Apr. 8, 2021

Related U.S. Application Data

(63) Continuation-in-part of application No. 29/708,507, filed on Oct. 7, 2019, now Pat. No. Des. 952,939.

(60) Provisional application No. 62/946,353, filed on Dec. 10, 2019.

(51) Int. Cl.

| A47J 42/30 | (2006.01) |
|---|---|
| A24C 5/42 | (2006.01) |
| A24B 7/06 | (2006.01) |
| A24C 5/02 | (2006.01) |
| A24C 5/39 | (2006.01) |
| A47J 42/40 | (2006.01) |
| A47J 42/24 | (2006.01) |

(52) U.S. Cl.
CPC ................ *A24C 5/42* (2013.01); *A24B 7/06* (2013.01); *A24C 5/02* (2013.01); *A24C 5/393* (2013.01); *A47J 42/24* (2013.01); *A47J 42/30* (2013.01); *A47J 42/40* (2013.01)

(58) Field of Classification Search
CPC .. A47J 42/34; A47J 42/30; A47J 42/22; A47J 42/24; A24C 5/42
See application file for complete search history.

(56) References Cited

U.S. PATENT DOCUMENTS

| 2,633,133 | A | 3/1953 | Higgins |
| 3,771,411 | A | 11/1973 | Hazel et al. |
| 4,280,666 | A | 7/1981 | Jones |
| 4,572,216 | A | 2/1986 | Josuttis et al. |
| 7,367,519 | B2 | 5/2008 | Groote et al. |
| 7,422,170 | B2 | 9/2008 | Bao |
| 7,565,818 | B2 | 7/2009 | Thomas et al. |
| 8,083,167 | B1 | 12/2011 | Namakian et al. |
| 8,171,939 | B2 | 5/2012 | Bao |
| 8,695,906 | B2 | 4/2014 | Hainbach |
| 8,733,679 | B2 | 5/2014 | Camitta |
| 9,427,020 | B2 | 8/2016 | Ruzycky |

(Continued)

OTHER PUBLICATIONS

An Archived Website Catalog Titled: Filling Devices, Smokecones. com (archived Feb. 19, 2012), http://www.smokecones.com/filling-devices-c-29.html [http://web.archive.org/web/20120219190856/http://www.smokecones.com/filling-devices-c-29.html].

*Primary Examiner* — Faye Francis

(74) *Attorney, Agent, or Firm* — Pequignot + Myers; Matthew A. Pequignot

(57) ABSTRACT

Grinding apparatus for grinding substances, such as tobacco. In certain embodiments, grinding apparatus with a plurality of receptacles which can be selectively filled with a ground product, such as tobacco. In still other embodiments, a grinding apparatus with a cone lifting mechanism, vibration inducing mechanism and/or with a selector capability or mechanism for selecting one or more of a plurality of receptacles, or storage area(s), for delivery of a ground product.

25 Claims, 30 Drawing Sheets

(56) References Cited

U.S. PATENT DOCUMENTS

| | | | |
|---|---|---|---|
| 9,895,698 B2* | 2/2018 | Spielman | B02C 18/144 |
| 10,492,524 B2* | 12/2019 | Ruzycky | A47J 42/16 |
| 11,178,905 B2* | 11/2021 | Karim | A24C 5/42 |
| 2011/0068026 A1 | 3/2011 | Fakhouri et al. | |
| 2013/0025608 A1 | 1/2013 | Fakhouri et al. | |
| 2013/0214068 A1 | 8/2013 | Camitta | |
| 2014/0182604 A1 | 7/2014 | Hutton | |
| 2014/0261471 A1* | 9/2014 | Ruzycky | A24C 5/42 131/108 |
| 2014/0353412 A1* | 12/2014 | Grumbacher | A24C 5/40 241/70 |
| 2016/0029691 A1* | 2/2016 | Ruzycky | B02C 18/144 241/24.1 |
| 2020/0139378 A1* | 5/2020 | Migale | A47J 42/24 |

\* cited by examiner

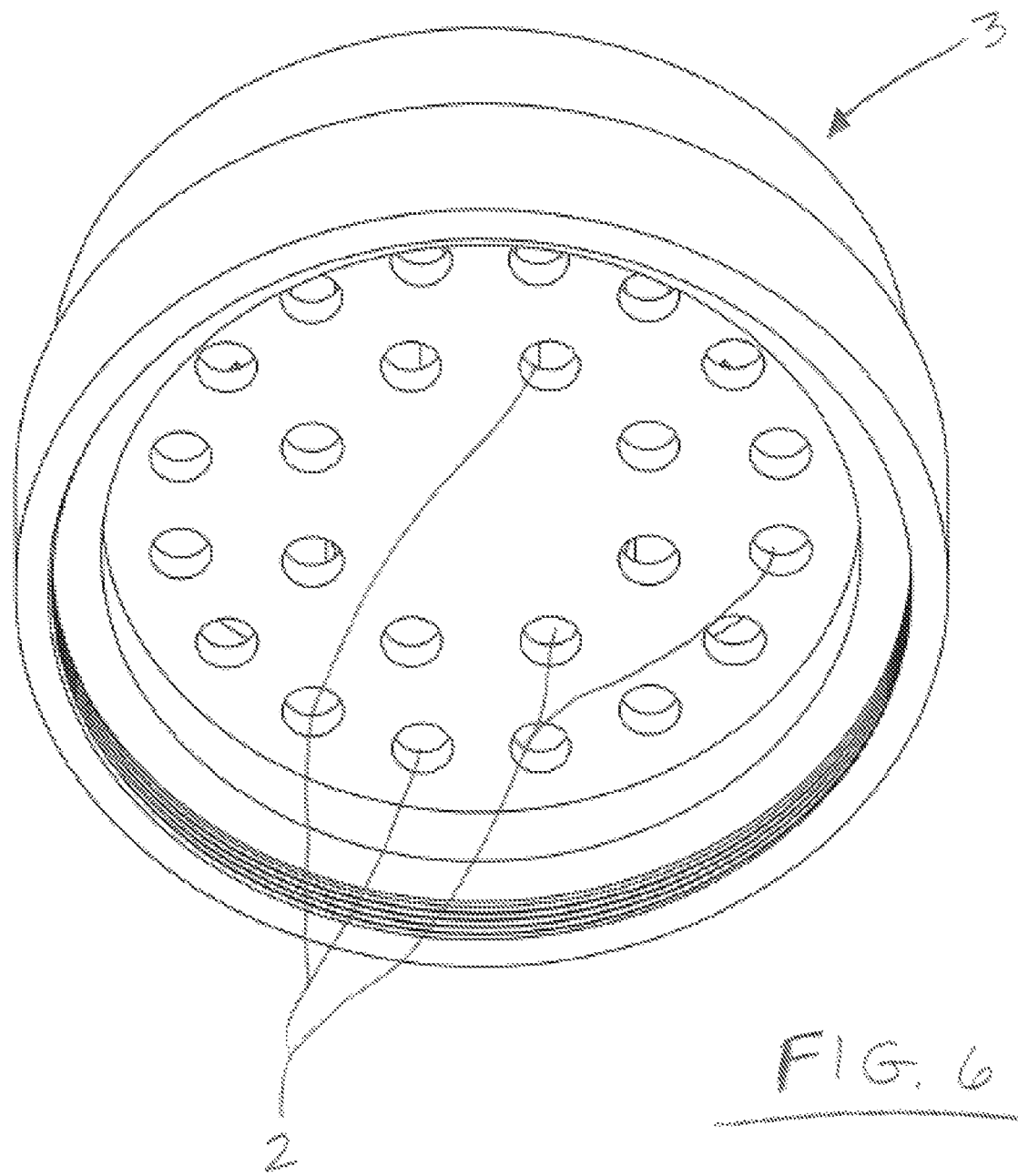

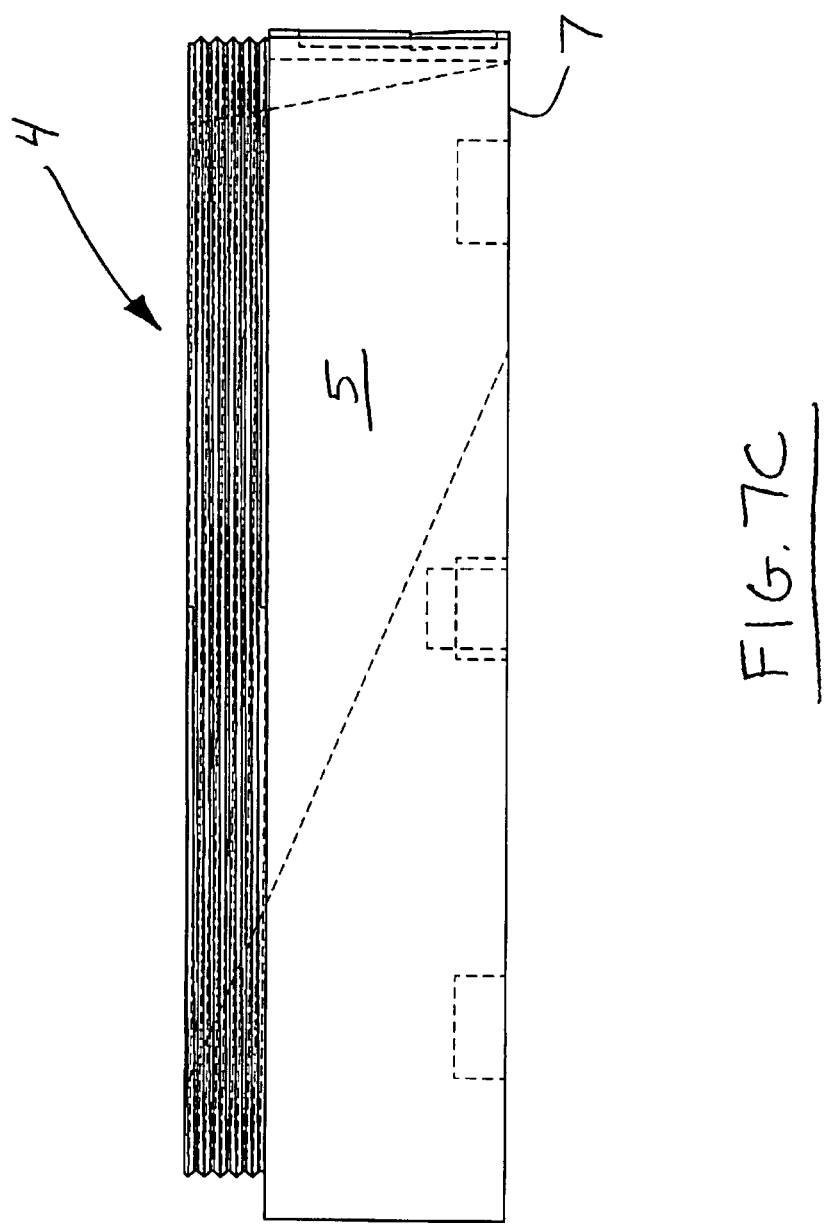

TOBACCO GRINDING, SORTING, AND/OR LOADING DEVICE

RELATED APPLICATION DATA

This application claims priority to U.S. Provisional Appl. No. 62/946,353, filed Dec. 10, 2019, which is hereby incorporated by reference. This application is also a continuation-in-part of U.S. Design patent application No. 29/708,507, filed Oct. 7, 2019, entitled TOBACCO GRINDING, SORTING, AND LOADING DEVICE, which is hereby incorporated by reference. U.S. Pat. No. 9,895,698, granted Feb. 20, 2018, entitled TOBACCO GRINDER AND/OR TOBACCO SORTING AND/OR LOADING DEVICE, is also hereby incorporated by reference.

FIELD OF THE INVENTION

This invention relates to a grinding apparatus for grinding substances, such as tobacco. In certain embodiments, this invention relates to a grinding apparatus with a plurality of receptacles which can be selectively filled with a ground product, such as tobacco.

BACKGROUND OF THE INVENTION

Although tobacco products have been produced and sold as pre-manufactured products (such as pre-made cigarettes, offered in cartons) by commercial enterprises for more than 100 years, there remains a demand in the art for hand made or custom made tobacco and related products.

For example, many smokers or consumers of smokable products believe that "roll-your-own" tobacco or smoking products are not as harmful to human health as commercially sold smoking products. This is, in part, because a person hand rolling a smokeable product, such as a cigarette, can control the specific content of the product and therefore potentially eliminate, or at least limit, undesirable chemicals in the custom "rolling" process.

Moreover, because of the taxation of pre-manufactured cigarettes (on state and federal levels, as well as by countries other than the United States), there is oftentimes an incentive to custom or hand roll smokeable products to avoid taxation and thereby reduce the cost of tobacco or other smokeable products to the consumer.

In addition to the above reasons, there is also sometimes a social factor which lends to the desirability of hand or custom rolling smokeable products. For example, "hookah" smoking has become popular in recent years with restaurants sometimes including hookah bar or smoking areas. Entire lounges devoted to hookah smoking have also emerged on the social scene. Similar to this phenomenon, the custom or hand rolling of tobacco or other smokeable products can and often does serve or function as a desirable component of a social gathering, such as a private party at a household.

Still furthermore, it may be desirable to add or substitute smokeable substances, in custom rolled smoking products, to obtain custom, smokeable "cigarettes" which contain smokable matter not otherwise readily available in pre-manufactured cigarette products. For example, custom rolling of cigarette type products which contain flavored tobacco(s), cloves, mixtures of tobaccos, or even cannabis (where legal, or for legal, medical purposes) is possible.

Even though the hand or custom "cigarette" rolling arts have included numerous innovations over the years related to grinders and rolling papers and the like, there remain certain desires for improvements in hand rolling operations, processes, and/or products, which often involve grinders for the grinding of tobacco (or other smokeable products). There also remain desires for improvements related to efficient filling of rolling papers, including cones, in addition to improvements in removing filled cones from fill/carrying chambers.

In view of the above-enumerated drawbacks and/or needs or desires for improvements in the smokeable products arts, it is a purpose of the herein described invention to address one or more of such drawbacks and/or desires as well as, or in the alternative, other needs which will become more apparent to the skilled artisan once given the present disclosure.

SUMMARY OF CERTAIN EMBODIMENTS OF THE INVENTION

Generally speaking, certain embodiments of this invention relate to grinding devices and/or ground matter loading and/or packaging and/or storage devices. In certain embodiments of this invention, apparatus are provided which are useful for grinding or macerating smokeable or other grindable substances, and, in some cases, thereafter delivering (or loading) the ground or macerated material into receptacles. In preferred embodiments, the receptacles may be pre-loaded with cylindrical or conical shaped "cones". In still other preferred embodiments, there is provided an apparatus which enables efficient loading of cones held in fill/carrying chambers and/or which enables efficient removal of the filled cones from such fill/carrying chambers.

The term "cones" as used herein shall refer to hollow, typically paper "packages" which are conventionally used in place of so-called rolling papers, for "packaging" ground tobacco (or other smokeable substances) into the shape of cigarettes for smoking. That is, rather than relying on a labor and skill intensive process of users rolling flat sheets of paper (filled with smokeable material) into cigarette shapes, "cones" are most often pre-rolled into a conical form with a narrow (preferably closed, or mostly closed, tip) and a wide open opposite end. Such cones are often made of paper but can be made of any other suitable material such as hemp. Moreover, although a conical shape is typically more efficient or otherwise more desirable, the term "cone" as used herein shall not be so limited. In other words, the term "cone" is contemplated within this application to include cylindrical (or other) shaped cones, and the configuration need not be pre-formed. For example, a user may fashion a conventional flat sheet of rolling paper into a conical cone shape, and the resulting paper packaging shall still be considered to fall within the definition of "cone" for the purposes of this application. Furthermore, the "cone" may be fashioned from any desirable material and configured into any suitable alternative shape.

In embodiments which are preferably (but not necessarily) operated with pre-installed cones, the pre-installed cones (when the device is operated) receive ground (or macerated) material when it is delivered (post-grinding) to the receptacles. Furthermore, in the most preferred embodiments of the various inventions disclosed within this application, the apparatus provided includes mechanically operated risers (or "elevators") which can be operated to lift already filled cones within their installed receptacle, so that the cones can be more conveniently and easily accessed and removed by a human user operating the apparatus. In still other preferred embodiments (though not required), the risers or elevators are operable to oscillate up/down and/or to vibrate so that ground (or macerated) material loaded into the pre-installed cones settles more densely into the cone, prior to cone removal. In still further non-limiting embodiments, the apparatus is configured with a storage chamber or container, and in some particularly preferred embodiments, a storage chamber (or container) which is independently removeable and/or sealable.

In one non-limiting embodiment of the inventions described above, there is provided apparatus comprising: a grinding chamber, including a grinder mechanism, for grinding a grindable material; an intermediate chamber for receiving ground material which has been ground by the grinder mechanism, the intermediate chamber including an aperture for delivery of ground material from the intermediate chamber to a selected delivery location; and a plurality of receptacles for receiving ground material, ground by the grinder and contained within the intermediate chamber, each one of the plurality of receptacles defining a separate receptacle volume, each of the separate receptacle volumes each being separately, selectively alignable with the aperture of the intermediate chamber to thereby selectively receive ground material dispensed from the intermediate chamber. In such embodiment, a lifter ring or cone elevator assembly is preferably included as described in more detail elsewhere herein.

In certain non-limiting, but preferred, embodiments, such as described and illustrated herein, a plurality of receptacles within the grinding apparatus are located spaced apart from one another, within a receptacle body, the receptacle body being rotatable about a central axis; the intermediate chamber being located within an intermediate body, the intermediate body also being rotatable about the central axis; wherein the intermediate body and the receptacle body are rotatable, about the central axis, with respect to one another thereby to selectively align one of the receptacle volumes with the aperture of the intermediate chamber to enable delivery of ground material from the intermediate chamber to the aligned receptacle volume via the aperture.

In still other non-limiting example embodiments, certain grinding or macerating apparatus are provided wherein the intermediate body has a top side and a bottom side; the grinding chamber being so located at and connected to the top side of the intermediate body such that when the grinder mechanism is operated to grind grindable material, ground material delivers from the grinding chamber to the intermediate chamber; the receptacle body being so located at and connected to the bottom side of the intermediate chamber, such that when the intermediate chamber contains ground material and the aperture of the intermediate chamber is aligned with a receptacle volume, ground material is delivered from the intermediate chamber to the aligned receptacle volume.

In order to aid in aligning the aperture of the intermediate chamber to one or more of the plurality of receptacle volumes, certain non-limiting example embodiments of the disclosed apparatus include one or more magnetic elements and one or more ferrous elements (i.e., elements attracted by the magnetic field of the magnetic elements). Alternatively, pairs of magnets (or magnetic elements) with opposite polarities are utilized with this apparatus. The magnetic and/or or ferrous elements are preferably so located and oriented such that attraction of such elements to each other aids in aligning the aperture of the intermediate chamber to one or more of the plurality of receptacle volumes. The magnetic elements may also serve, in some embodiments, to hold portions of the apparatus together. In certain of these non-limiting embodiments, the apparatus further includes at least two spaced apart magnetic elements and at least two spaced apart ferrous or opposite polarity magnetic elements, such elements being located on opposite rotatable bodies selected from the intermediate body and the receptacle body, wherein when the at least two spaced apart magnetic elements are aligned with the at least two ferrous (or opposite polarity magnetic elements), as a result of rotation of the intermediate body relative to the receptacle body, the aperture of the intermediate body is aligned with a receptacle volume.

Certain example embodiments of the apparatus described herein include a storage mechanism or area or chamber in which material which has been ground or macerated may be stored. In one or of such non-limiting embodiments, a storage chamber is formed in a provided storage body, the storage body being located at and connected to the receptacle body. In such or other embodiments, at least one receptacle volume includes an opening at a bottom end thereof for ground material to pass through to be delivered to and stored within the storage chamber. In one or more of such or similar embodiments, at least one receptacle volume includes a bottom end which is at least substantially closed such that ground material may be retained, after grinding, in the receptacle volume.

In certain non-limiting embodiments of this invention, the provided apparatus include mechanisms or structural configurations which are provided for assisting in the loading or smokeable materials into custom or self-wrapping papers, so that smokeable cigarette-type products may ultimately be formed or otherwise obtained. In one or more of such example embodiments, at least one receptacle volume, in one or more of the herein described apparatus, includes a wrapping paper in a cone or cylindrical form, nested within the at least one receptacle volume, for receipt of ground material ground by the grinder mechanism and delivered by the aperture of the intermediate chamber. In certain embodiments, but not all embodiments, at least one of the described and illustrated receptacle volumes is preferably (but not necessarily) conical in configuration. In certain further example embodiments, an optional, removable tamping rod, preferably but not necessarily carried within a rod aperture, is provided to be used for tamping or packing ground or macerated material into or within loaded wrapping papers or cones, carried by one or more receptacle volumes.

In the grinding (or macerating) apparatus described herein, numerous ways of operating or conducting the grinding (or macerating) function are envisioned. For example, in certain embodiments, the grinder mechanism is a manually operated grinder mechanism which grinds material located within the grinding chamber, when the grinder mechanism is operated by hand. In other non-limiting embodiments, the grinder mechanism is optionally operated by a grinder motor, wherein the grinder mechanism grinds material located within the grinding chamber, when the grinder motor is operated.

In some non-limiting embodiments of the grinding apparatus described herein, the grinding apparatus is modular. For example, in certain examples of such embodiments, a provided grinding chamber is removably connected to the intermediate body; the intermediate body is removably connected to the receptacle body; and/or the receptacle body is removably connected to the storage body. In at least one of these embodiments, the grinder and/or grinding chamber may be removed from the larger assembly. In preferred (but optional) versions of these embodiments, an intermediate body having a funnel region for directing delivery of ground material may be plugged and an (optional) bottom cap installed to enclose the bottom of the removeable grinder assembly so that it can be independently transported or stored, with ground material securely stored therewith.

In an alternative embodiment, there is provided: apparatus comprising a grinding chamber, including a grinder mechanism, for grinding a grindable material; an intermediate body rotatable about a central axis; an intermediate chamber, located within said intermediate body, for receiving ground material which has been ground by said grinder mechanism, wherein the intermediate chamber includes a downwardly sloping bottom surface, for collecting and thereafter delivering received ground material, and a delivery aperture located proximal a bottom area of said downwardly sloping bottom surface, said delivery aperture being located offset from said central axis and configured and located to deliver ground material to a selected delivery location; a receptacle body rotatable about said central axis; a plurality of receptacles contained within said receptacle body for receiving ground material, ground by said grinder mechanism, each one of said plurality of receptacles defining a separate receptacle volume, each one of said plurality of separate receptacle volumes being located offset from said central axis, each one of said plurality of separate receptacle volumes being separately, selectively alignable with said delivery aperture to thereby selectively receive ground material dispensed from said intermediate chamber at a location offset from said central axis; wherein said intermediate body and said receptacle body are so designed and assembled so as to be rotatable, about said central axis, with respect to one another thereby to selectively align one of said plurality of receptacle volumes with said delivery aperture of said intermediate body, at a location offset from said central axis, to enable delivery of ground material from said intermediate chamber to said aligned receptacle volume via said delivery aperture. As with other herein described embodiments, a lifter ring or cone elevator assembly is preferably also included as described in more detail elsewhere herein.

Although the above described embodiment is explained as having a rotatable body, this can have multiple meanings. For example, it is envisioned, in some embodiments, that there is a central axis and a central pivot pin upon which parts may be installed for alignment and to provide rotatability. However, in other embodiments, a central pivot pin need not be used. For example, in some embodiments, apparatus pieces may be held together via snap fit arrangements and/or using magnetic field connections. That is, opposing magnetically attracted elements can be installed on parts to be connected, such as on the receptacle body and on the intermediate body which installs (in some embodiments) between the receptacle body and the grinder body. Using such opposing magnetically attracted elements, with sufficiently strong magnetic fields employed, the pieces can be connected to one another using the magnetic fields independently. Alternatively, the magnetic fields may be combined with other features, such as threads or snap fitments, to achieve more secure or stable assembly. In such embodiments employing magnetic fields, a pivot pin (or other assembly pin type) need not be used. Instead, in order to align a receptacle in the receptacle body with a funnel portion of an intermediate body (in communication with a grinder body to deliver ground material to the receptacle volumes), the intermediate body assembly can be lifted against the securing force of the magnetic field to turn the intermediate body relative to the receptacle body. In such manner, the intermediate body is rotated relative to the receptacle body without being rotatable on the receptacle body.

In some of the embodiments, a storage chamber formed in a storage body is also provided, with the storage body being located at and connected to the receptacle body. Such embodiments also preferable include a pass-through receptacle (for passing ground material through to a storage receptacle), contained within the receptacle body. The pass-through (or storage) receptacle is defined by its own receptacle volume and has an opening at a bottom end thereof for ground material to pass through to be delivered to and stored within the storage chamber.

In some of the embodiments described above, the intermediate body has a top side and a bottom side; the grinding chamber is so located at and connected to the top side of said intermediate body such that when the grinder mechanism is operated to grind grindable material, ground material delivers from said grinding chamber to said intermediate chamber; and the receptacle body is so located at and connected to the bottom side of said intermediate chamber, such that when the intermediate chamber contains ground material and the aperture of the intermediate chamber is aligned with one of the plurality of receptacle volumes, ground material is delivered from the intermediate chamber to the aligned receptacle volume. In at least one variation of such embodiments, the grinding chamber is removably connected to the intermediate body and the intermediate body is removably connected to the receptacle body. In some optional versions of such embodiments, the aperture of the intermediate chamber may (optionally) be provided with a plug, and a cap may be provided to cover the bottom end of the intermediate body when it is removed from the receptacle body. Being removeable, pluggable, and coverable with a cap as such, this particular embodiment allows for the grinder and intermediate body assembly to be removed and transported and/or stored as an independent unit. This can be for various reasons such as to enable use of the grinder without requiring use of the receptacle body to fill or load cones. In similar or alternative embodiments, a spare intermediate body can be provided for swapping out with the existing intermediate body. This embodiments provides additional versatility by allowing the grinder to be used as a stand-alone grinder and without the need for an aperture plug or intermediate body cap. For example, a swappable, alternative intermediate body can be provided which contains a storage chamber only, but no aperture for delivering ground material to a receptacle (i.e., thus obviating the need for both a plug and a cap).

In still other preferred embodiments (though optional), the risers or elevators (when provided in certain embodiments) are operable to oscillate up/down and/or to vibrate so that ground (or macerated) material loaded into the pre-installed cones settles more densely into the cone, prior to cone removal. In still further non-limiting embodiments, the apparatus is configured with a storage chamber or container, and in some particularly preferred embodiments, a storage chamber (or container) which is independently removeable and/or sealable.

In certain embodiments, one or more mechanisms may be provided to assist or facilitate transmission of ground material from the intermediate chamber, or another area of the herein disclosed grinding apparatus, to at least one receptacle volume or to a storage area. In one example of such a non-limiting embodiment, a vibration inducing mechanism is provided which, when operated, induces vibration in at least the receptacle body and/or the intermediate body.

Certain examples of the invention are now described below with respect to certain non-limiting embodiments thereof as illustrated in the following drawings wherein:

BRIEF DESCRIPTION OF THE DRAWINGS

FIG. 6 illustrates a bottom, perspective view of a lower portion of the grinder mechanism illustrated in FIG. 5.

FIG. 7C illustrates an alternative side, partial x-ray view of the intermediate body illustrated in FIG. 7A.

DETAILED DESCRIPTION OF CERTAIN EMBODIMENTS

Figure 1:
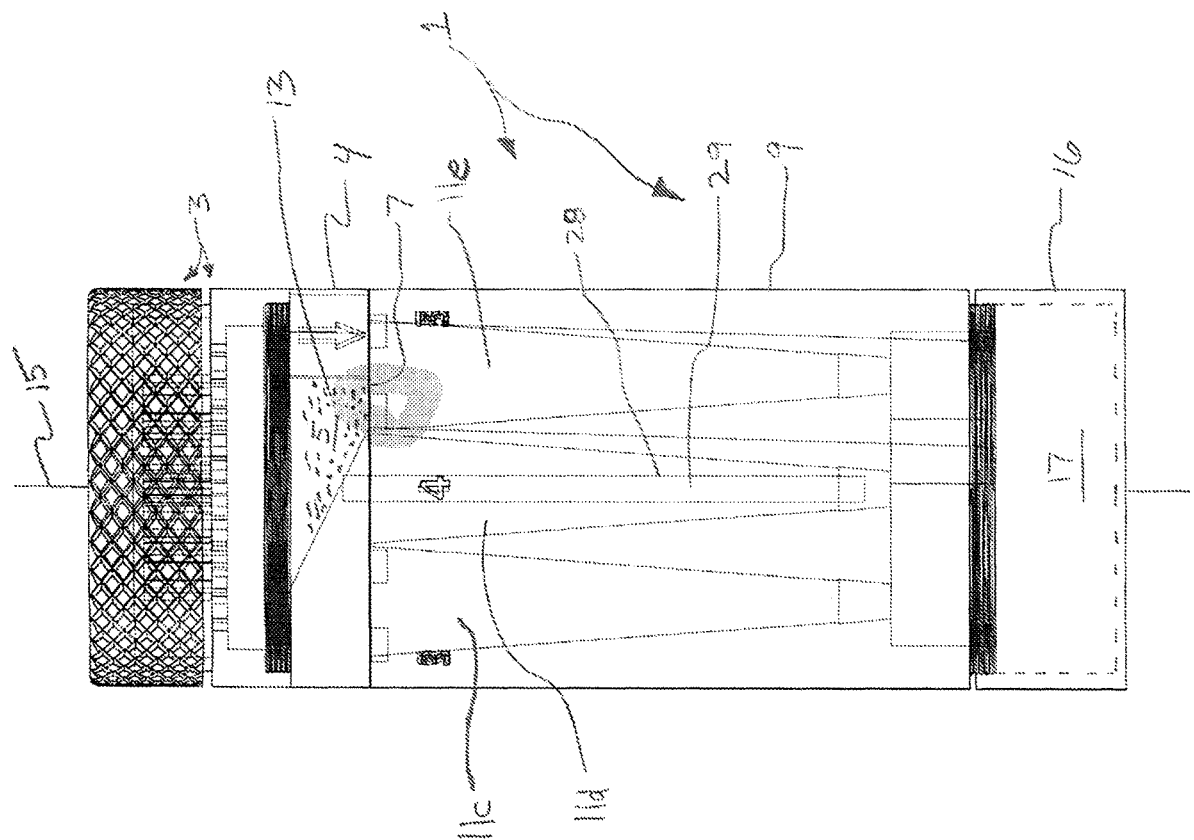
FIG. 1 illustrates one embodiment of a grinding apparatus according to the subject invention.
Figure 2:
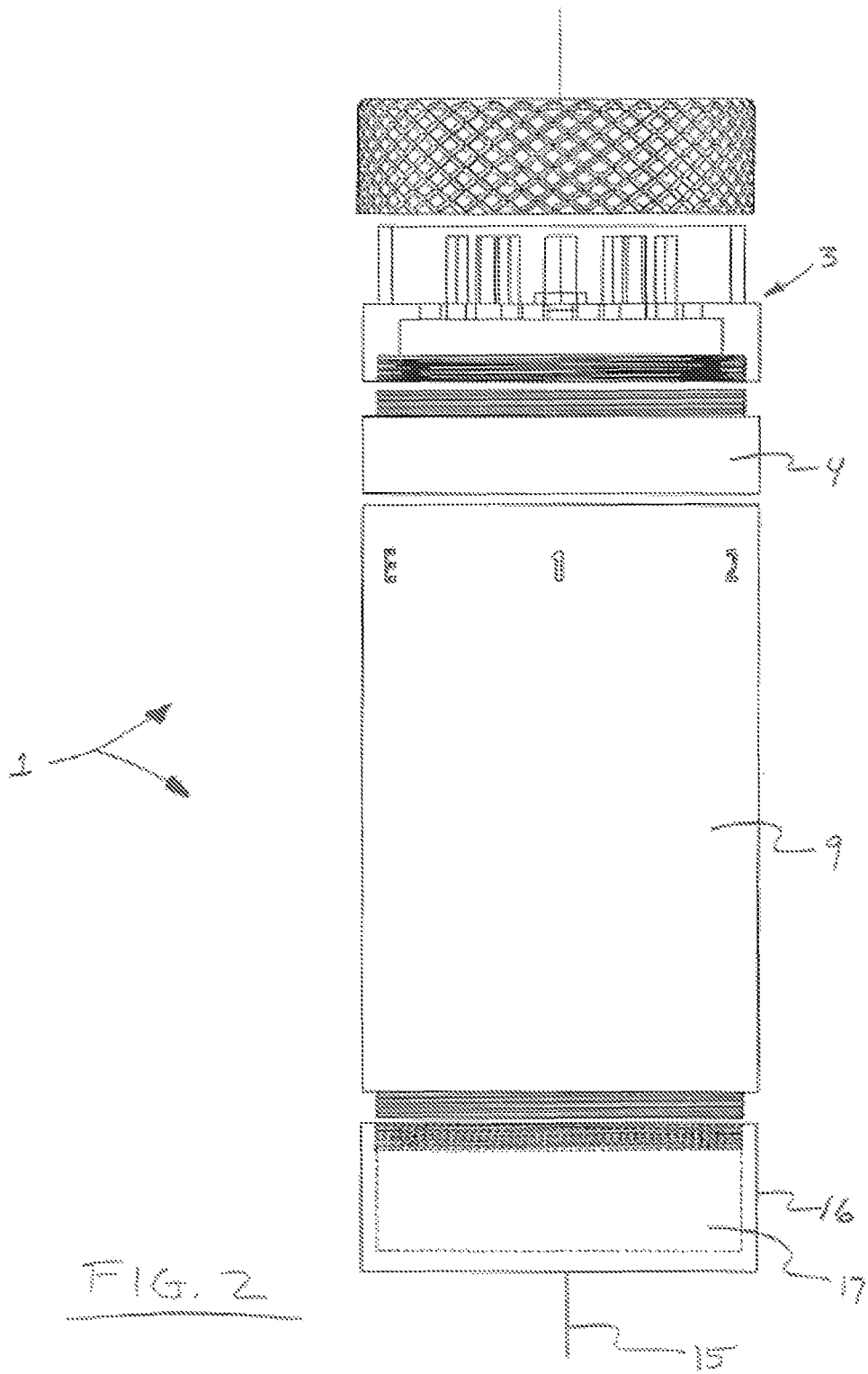
FIG. 2 illustrates an alternative embodiment of the apparatus depicted in FIG. 1, with an opaque rather than a transparent receptacle body.
Figure 3:
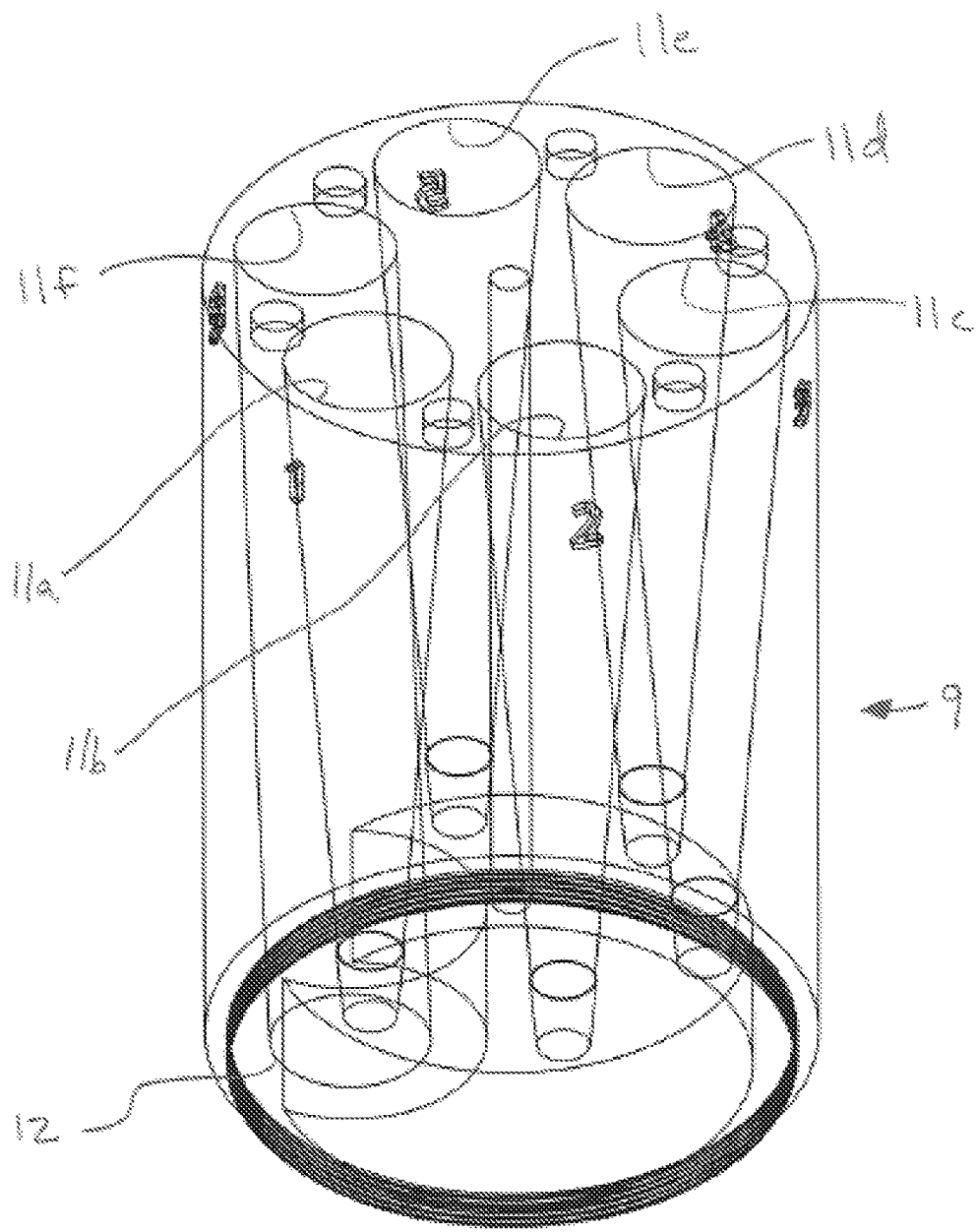
FIG. 3 illustrates one example of a receptacle body useful with the subject invention.
Figure 4:
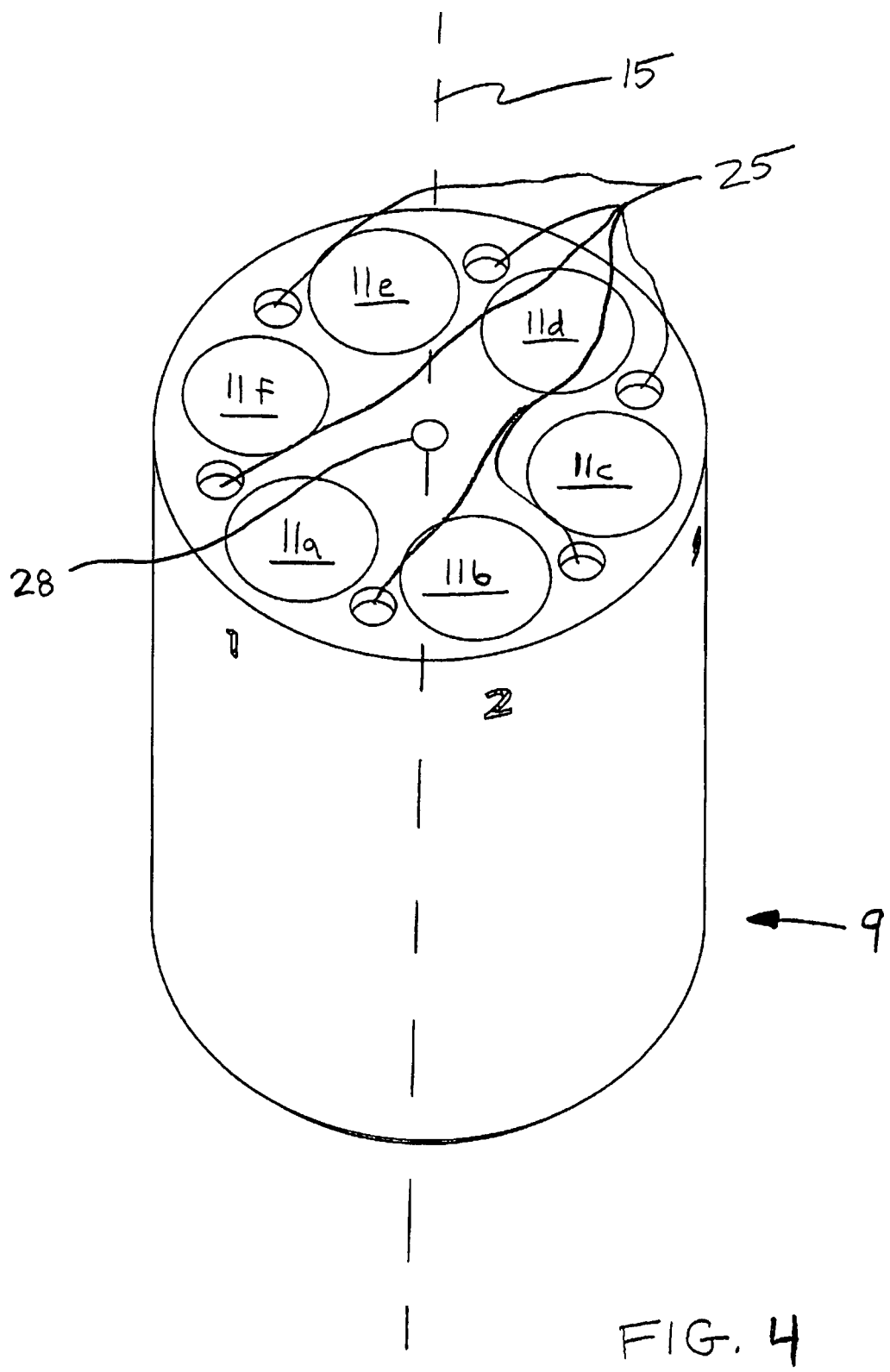
FIG. 4 illustrates another example of a receptacle body useful with the subject invention.

For a more complete understanding of the present invention, reference is now made to the following description of various illustrative and non-limiting embodiments thereof, taken in conjunction with the accompanying drawings in which like reference numbers indicate like features.

Addressing one or more of the above-described drawbacks or needs in the prior art (or other drawbacks or needs not specifically described herein), at least one embodiment of the subject invention comprises a grinding apparatus capable of grinding material, such as tobacco or other smokeable material, and selectively delivering desirable amounts of such ground material to chosen or selected receptacle volumes. In some embodiments, the ground material may also be delivered to a storage area or chamber, when desired, for later access or use by the device operator.

Referring now to FIGS. 1-10, a non-limiting, example embodiment of such a grinder apparatus 1 is illustrated therein. Grinder apparatus 1, as illustrated, generally comprises at least three main components (preferably detachable from one another), including a grinding mechanism 3 sitting on top of an intermediate body 4, which in turn is connected to a top portion of receptacle body 9. Optionally, a storage chamber body 16 is also provided, attached at or to a bottom portion of receptacle body 9, in embodiments which include storage (e.g., as opposed to receptacle loading) functionalities. While FIG. 1, for example, illustrates a grinder apparatus having various parts, such as the external wall of receptacle body 9, as translucent or transparent, other embodiments utilize (partially or fully) opaque walls or parts (see, e.g., FIG. 2). The inclusion of translucent or transparent parts is largely for ornamental purposes, but may at times offer certain benefits to device functionality. For example, in embodiments which employ translucent or transparent parts, it is possible to see when chambers or receptacle volumes contain ground material (or when they contain smoking or rolling papers or cones).

Figure 5:
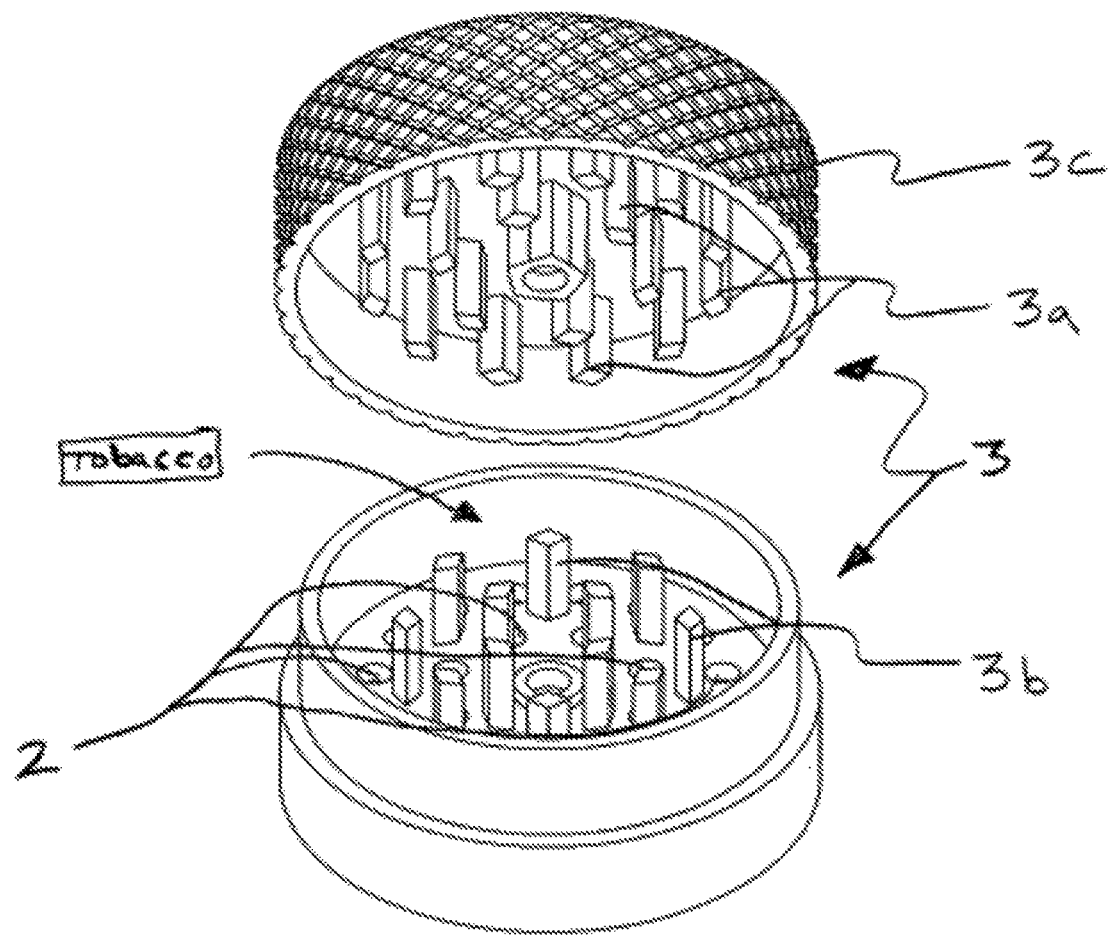
FIG. 5 illustrates one example of a grinder mechanism useful with the subject invention.

Grinding mechanism 3, as illustrated in FIG. 5, is preferably but not necessarily at least a two-part mechanism which may be opened, as depicted in the drawings, to insert or load grindable material such as tobacco. Once tobacco, or a similar substance, is loaded into the grinding mechanism, the upper and lower halves of mechanism 3 are assembled to one another, such that they are rotatable one with respect to the other. When rotated as such, upper and lower "teeth" 3a and 3b act in concert with each other (e.g., move past each other, with the inserted tobacco forced or pushed between the upper and lower teeth) to break-up, macerate, and/or grind the inserted tobacco into smaller, preferably fine bits or portions which are more easily burned for smoking. Of course, while the illustrated grinding mechanism 3 works well with apparatus 1, and includes knurled grip portions 3c for providing a reliable gripping surface when hand grinding tobacco, other grinder mechanism types may be used with the present invention. For example, a hand crank and/or one or more motors may be provided to assist with grinding operations. Moreover, banks of teeth 3a and 3b may be replaced with other grinder elements such as cutting blades or crushing elements.

Figure 7A:
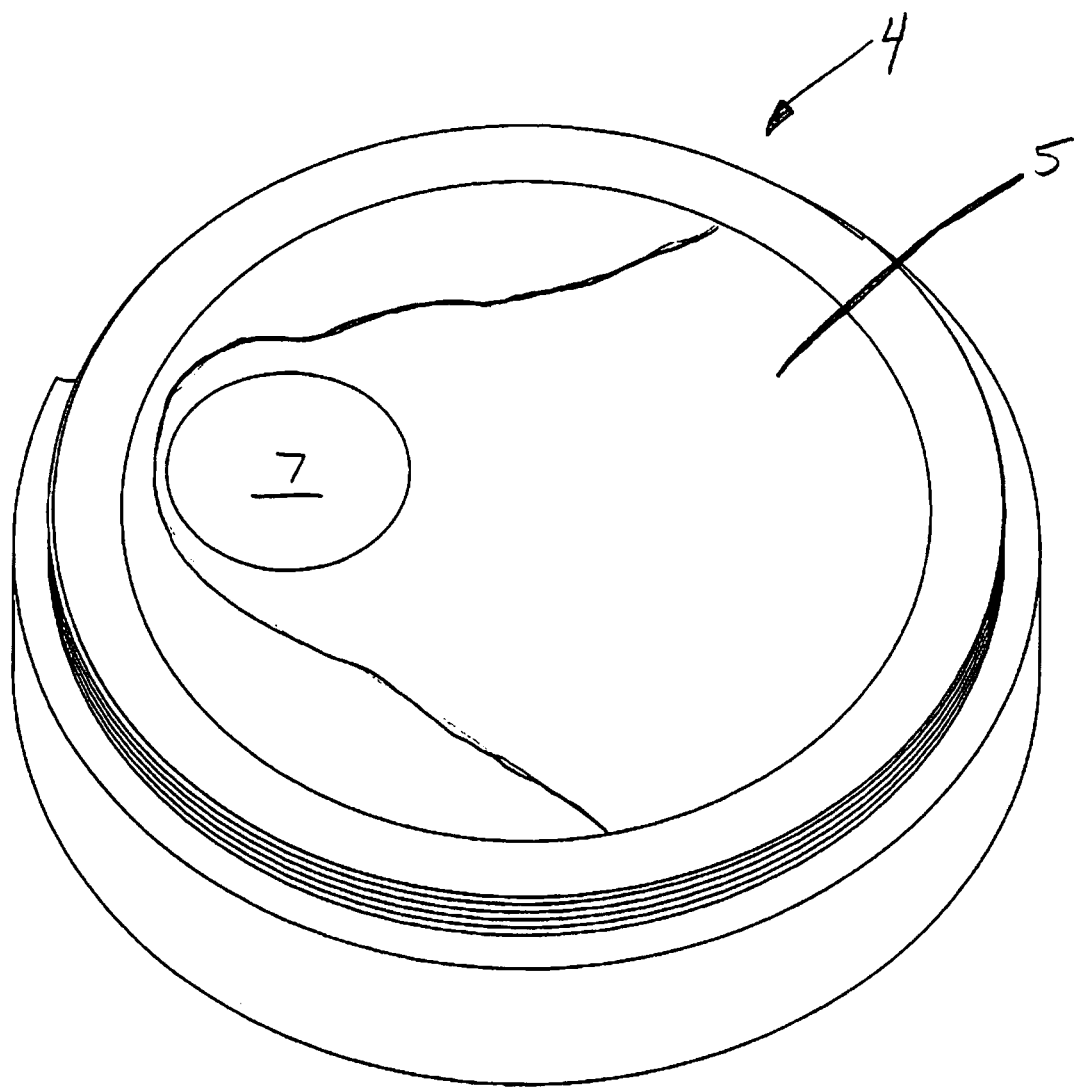
FIG. 7A illustrates one example of an intermediate body useful with the subject invention.
Figure 7B:
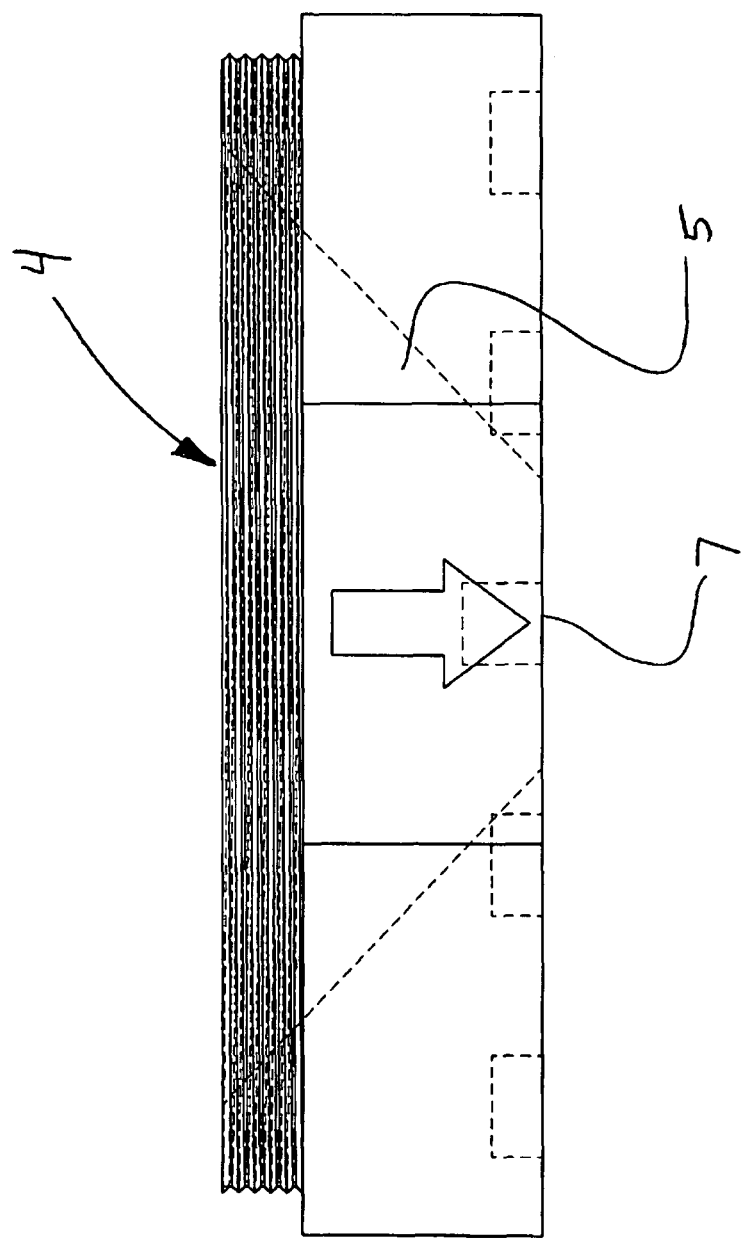
FIG. 7B illustrates a side, partial x-ray view of the intermediate body illustrated in FIG. 7A.
Figure 7D:
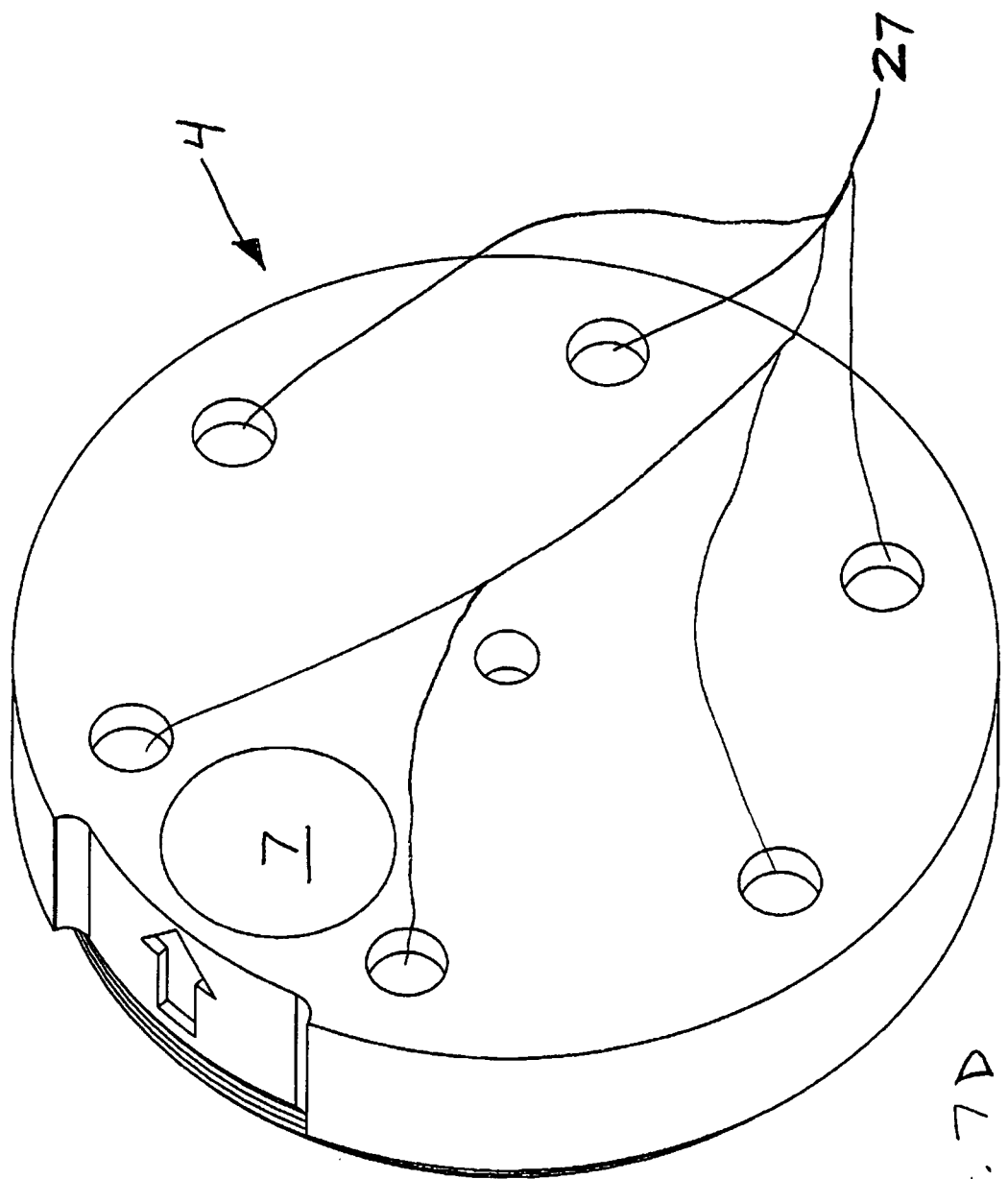
FIG. 7D illustrates a bottom, perspective view of a lower portion of the intermediate body illustrated in FIG. 7A.
Figure 8:
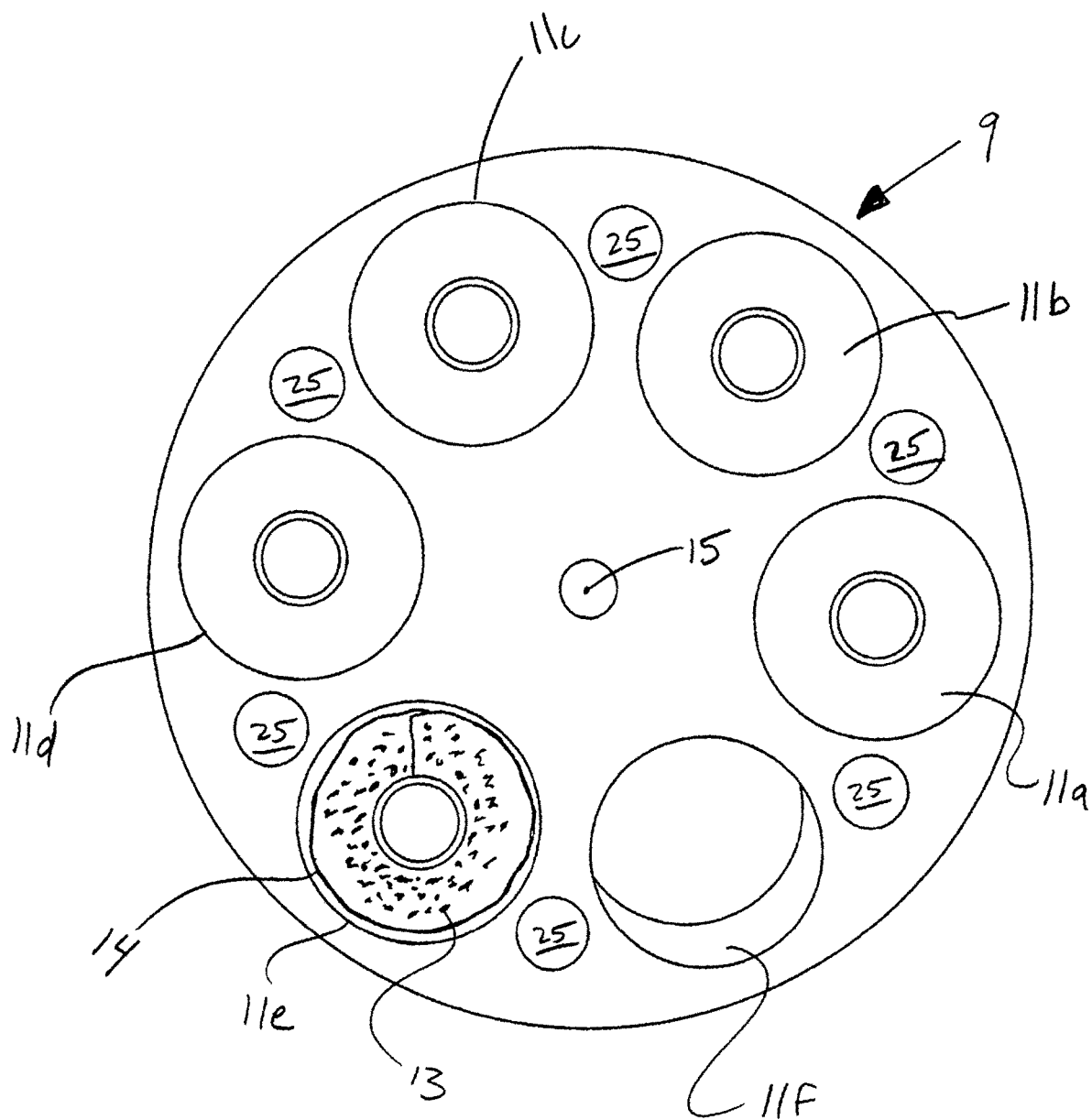
FIG. 8 illustrates one example of a receptacle body useful with the subject invention, with an example wrapping paper, and ground material, loaded into a receptacle volume.
Figure 9:
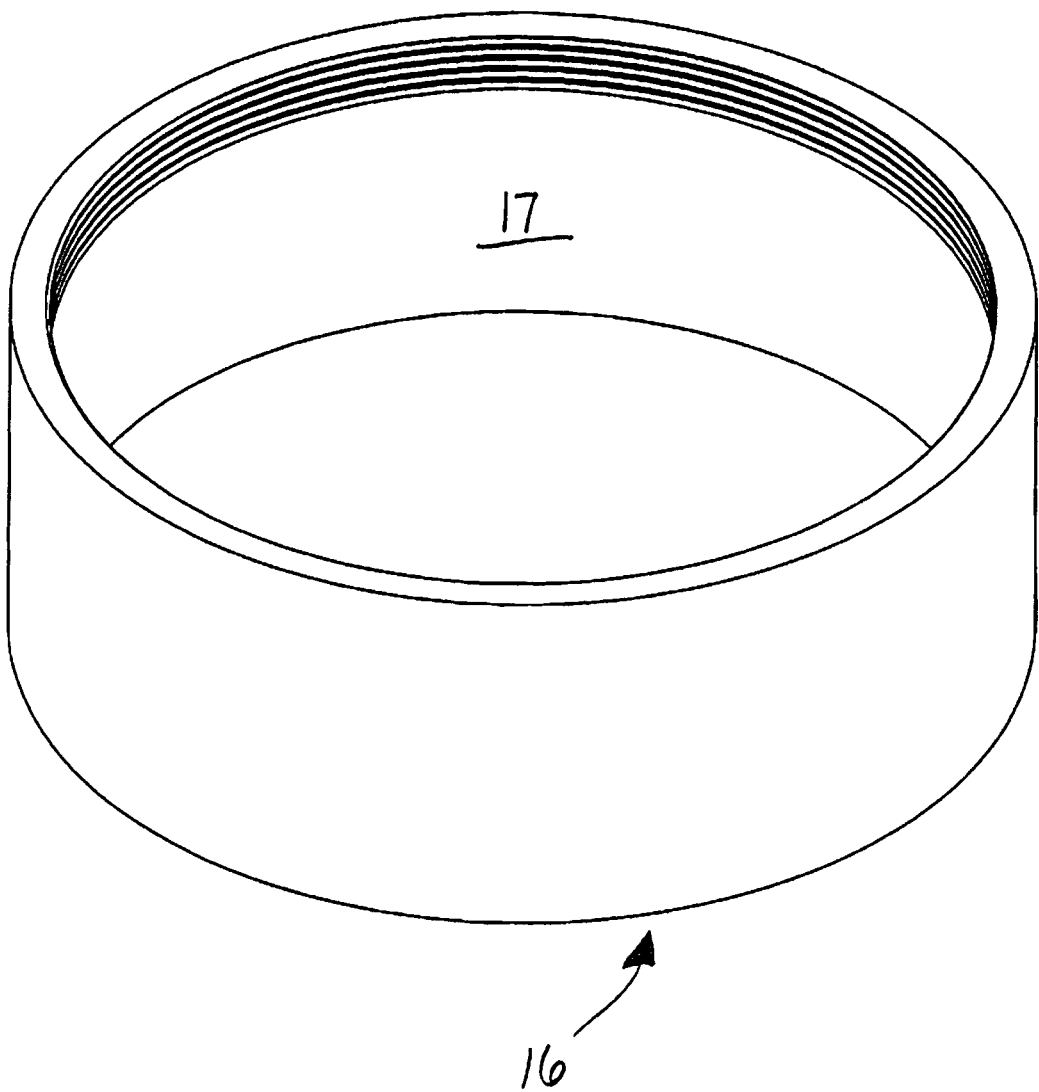
FIG. 9 illustrates one example of a storage chamber useful with the subject invention.
Figure 10:
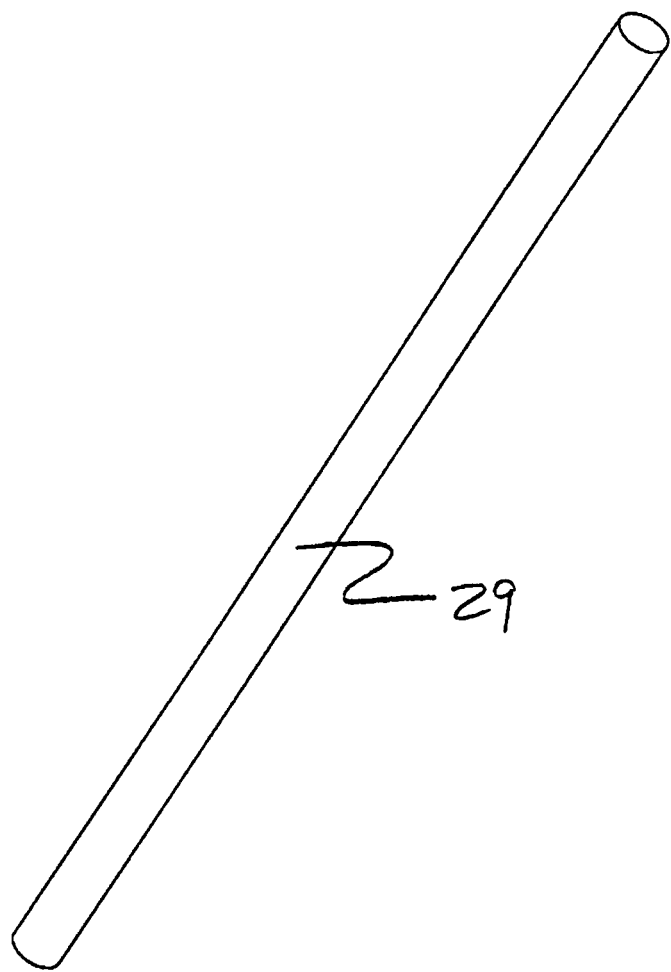
FIG. 10 illustrates one example of an optional tamping rod useful with the subject invention.
Figure 11:
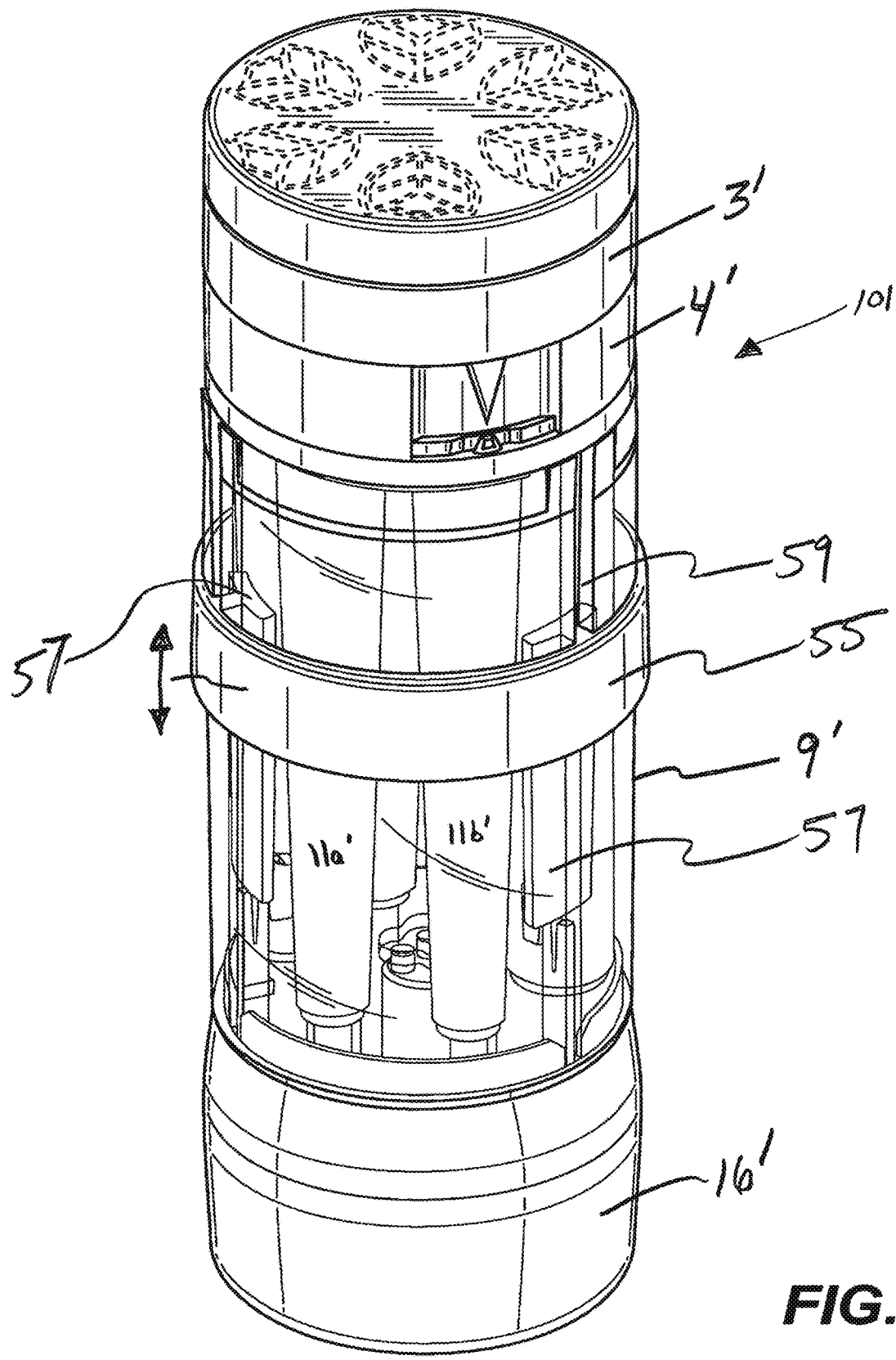
FIG. 11 is a perspective view of an alternative embodiment of a grinding apparatus according to the subject invention.
Figure 12:
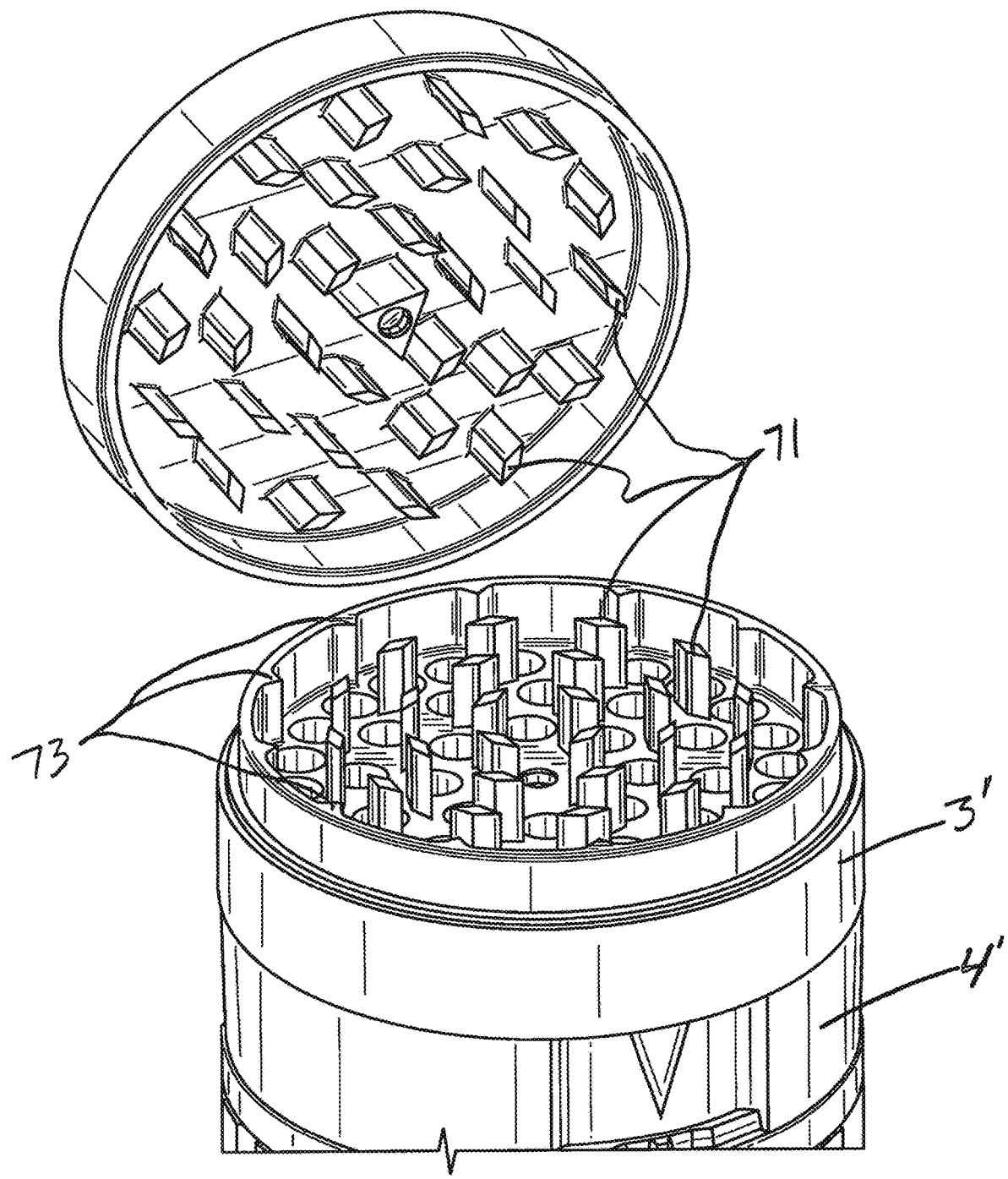
FIG. 12 illustrates one example of a grinder mechanism useful with the subject invention.
Figure 13:
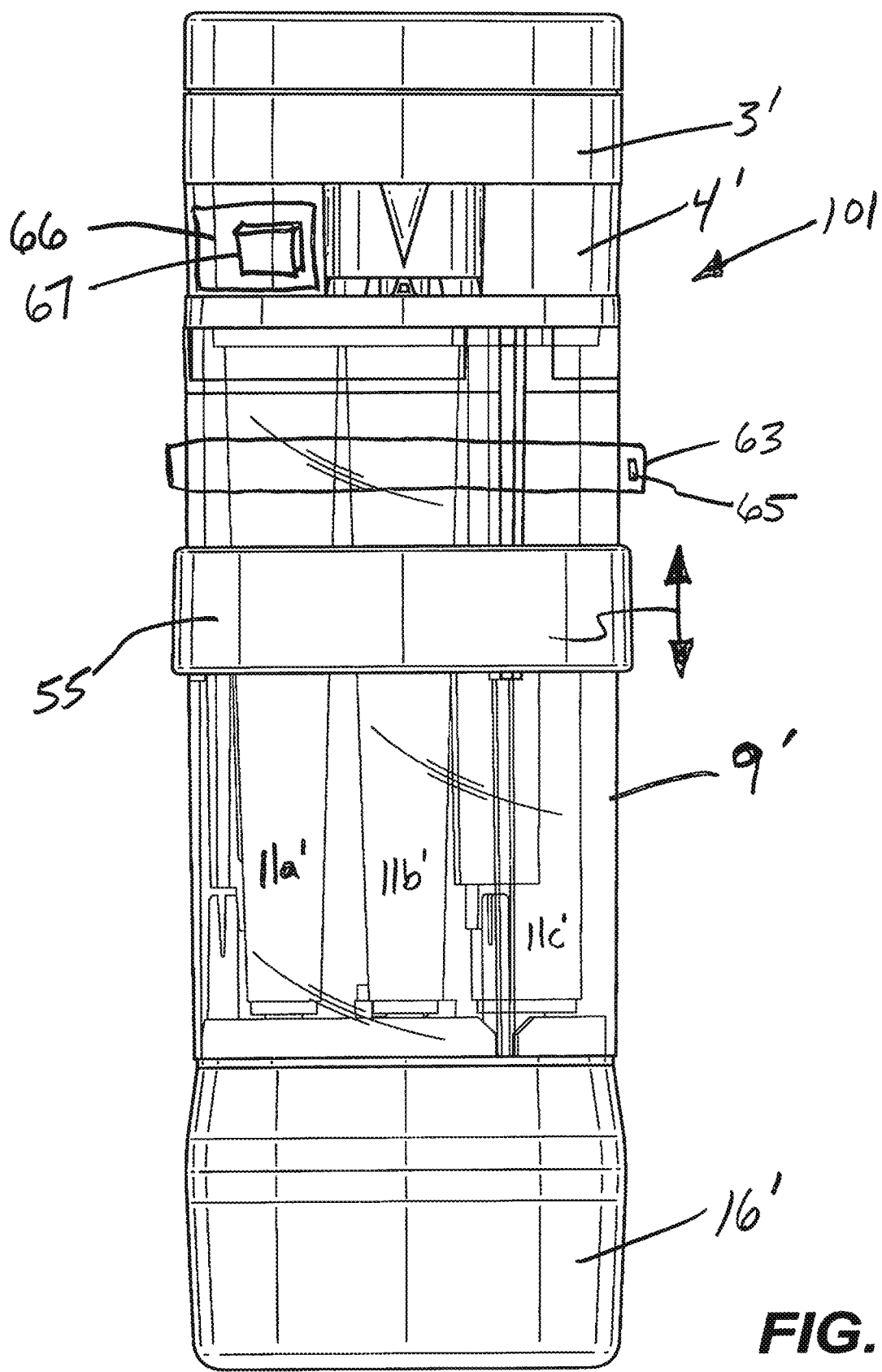
FIG. 13 is a plan view of the grinding apparatus illustrated in FIG. 11.
Figure 14:
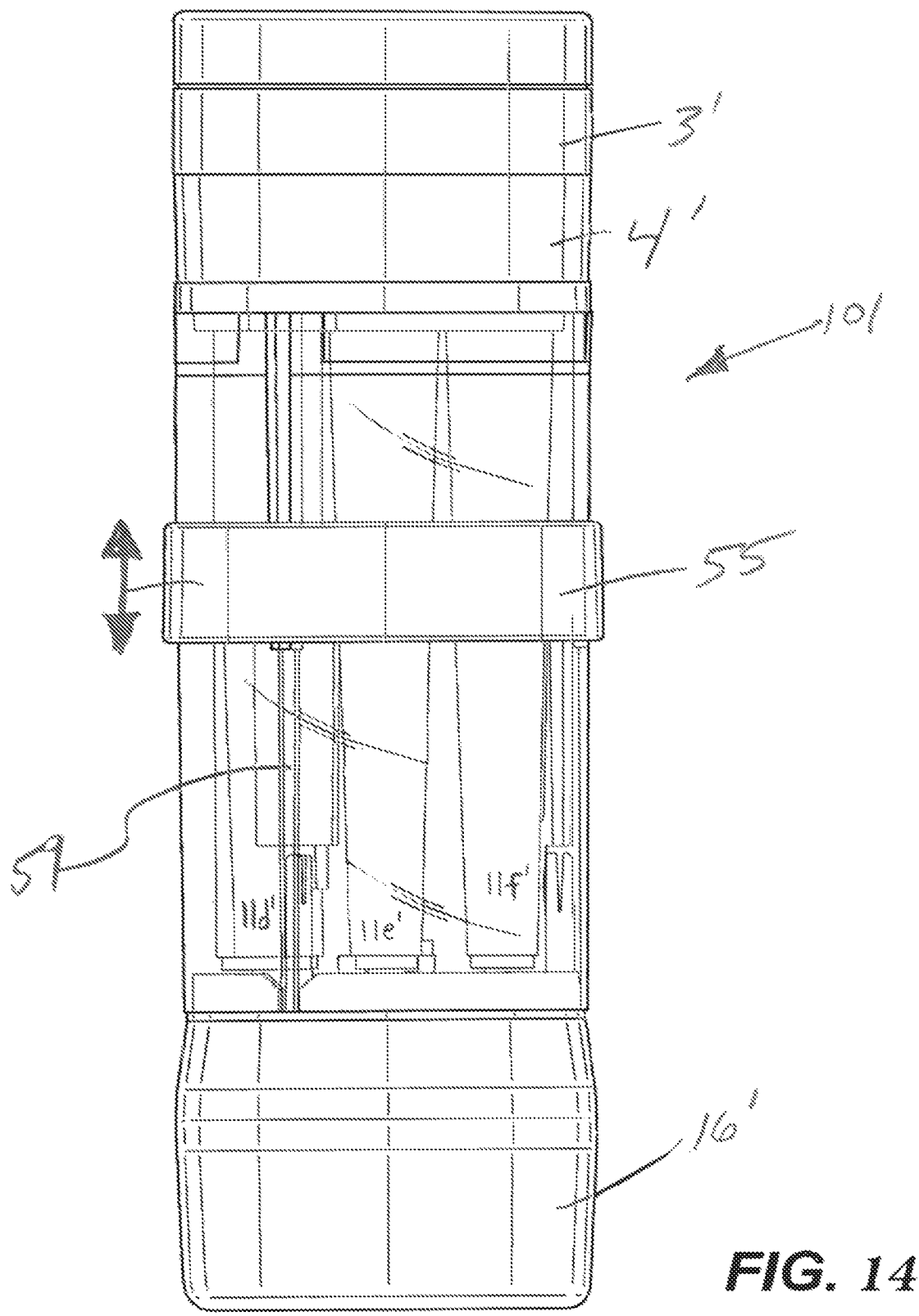
FIG. 14 is an different plan view of the grinding apparatus illustrated in FIG. 11.
Figure 15:
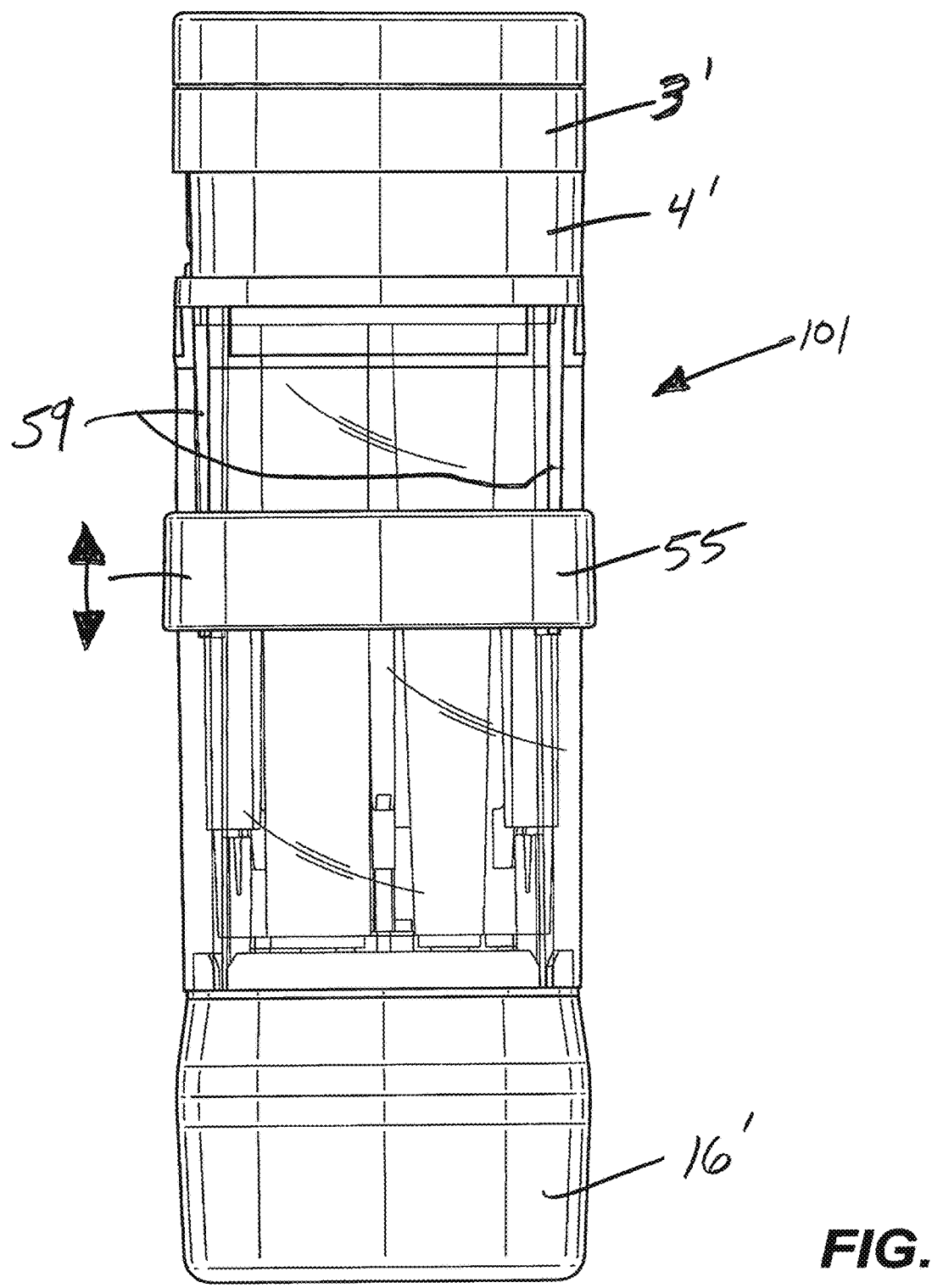
FIG. 15 is a third plan view of the grinding apparatus illustrated in FIG. 11.
Figure 16:
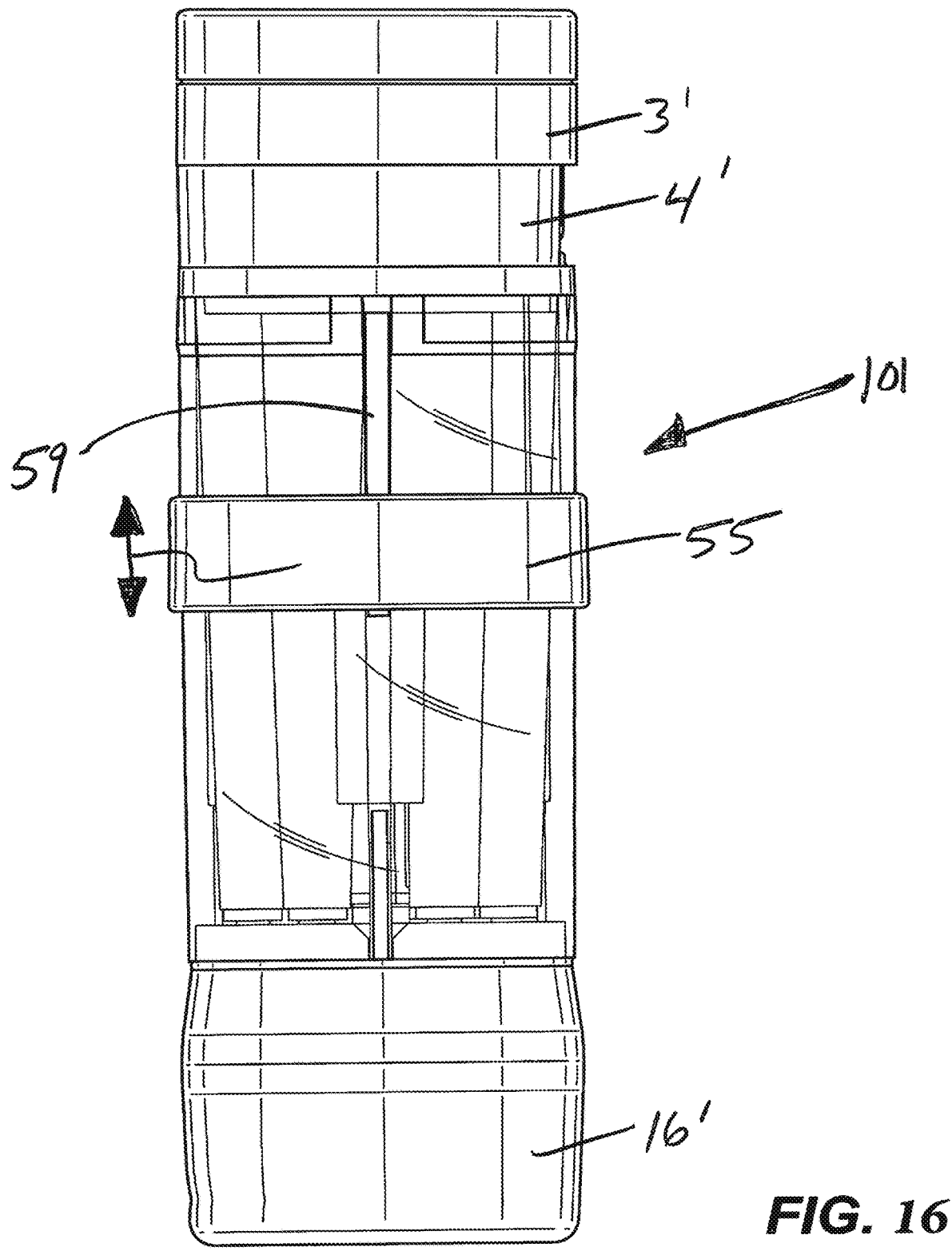
FIG. 16 is a fourth plan view of the grinding apparatus illustrated in FIG. 11.
Figure 17:
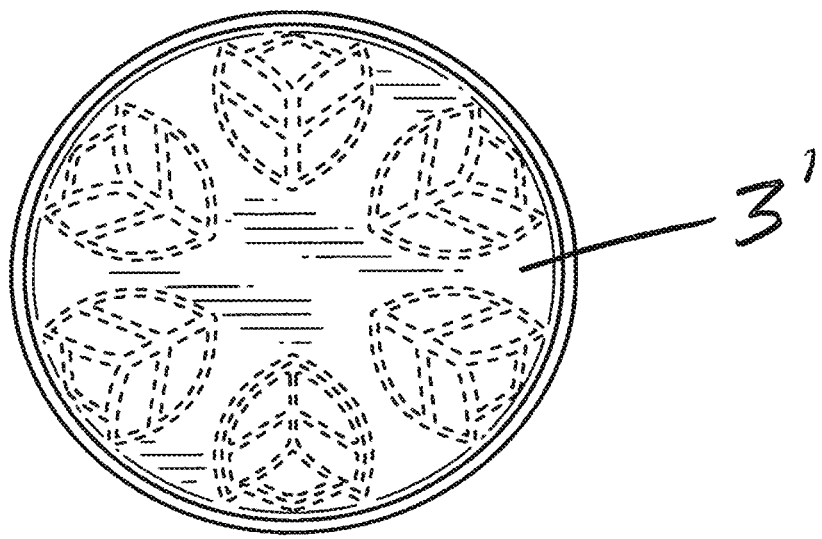
FIG. 17 is a top view of the grinder mechanism of the grinder apparatus illustrated in FIG. 1.
Figure 18:
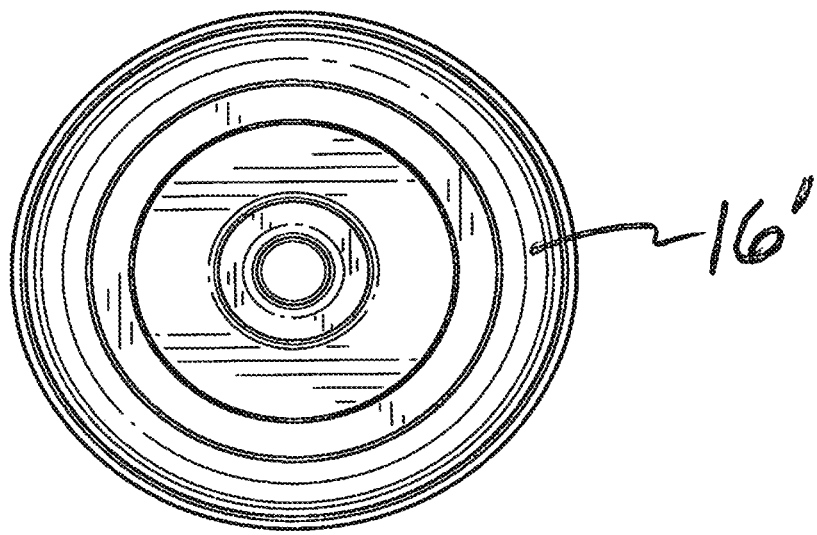
FIG. 18 is a bottom view of the storage body of the grinder apparatus illustrated in FIG. 11.
Figure 19:
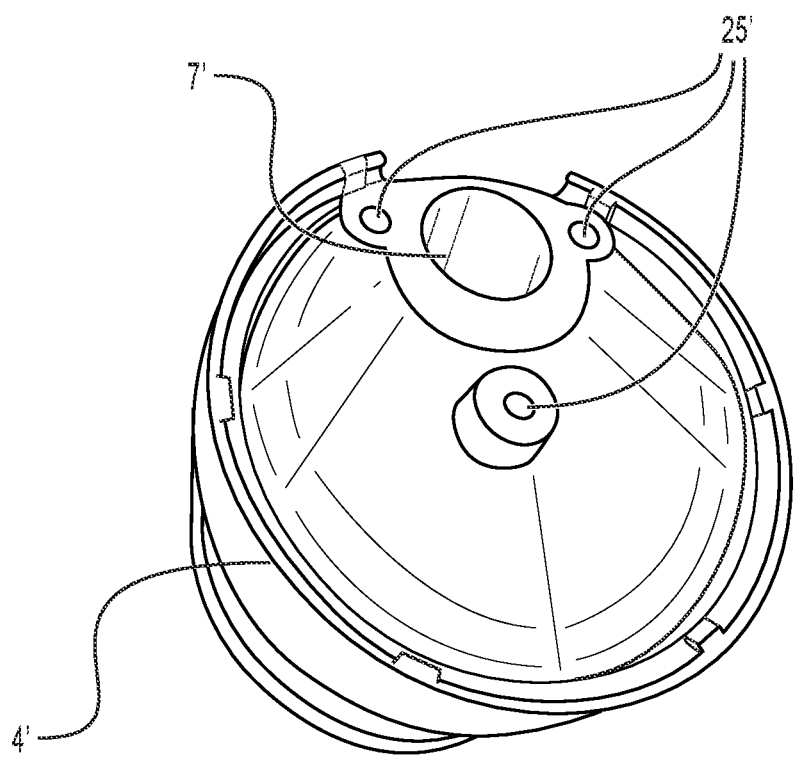
FIG. 19 is a bottom view of the intermediate body of the grinder apparatus illustrated in FIG. 11.
Figure 20:
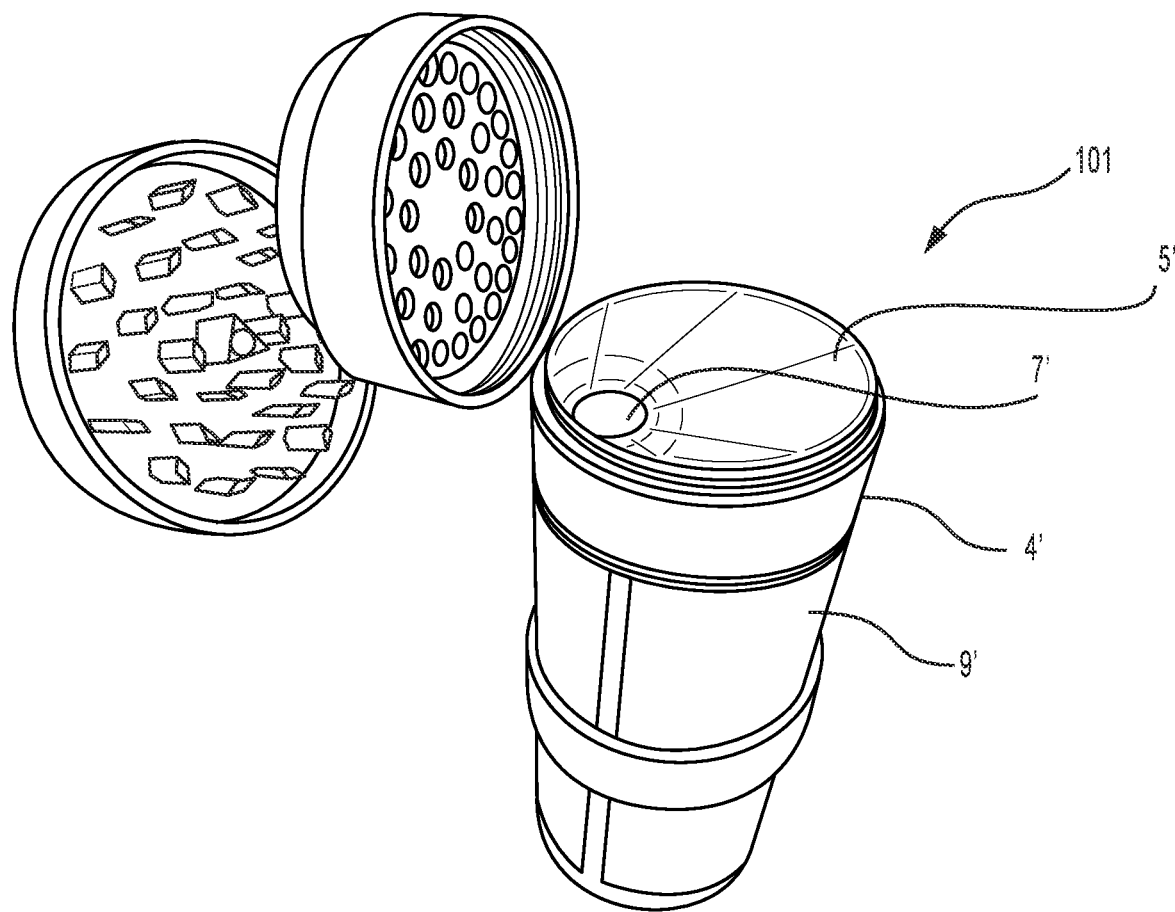
FIG. 20 is a perspective view of the grinding apparatus illustrated in FIG. 11 with the grinder mechanism removed.

Once the inserted tobacco (or any other substance added to the device to be ground) is processed in grinder mechanism 3, the smaller, fine tobacco particles which are obtained during a grinding operation are small enough to pass through grinder apertures 2, through which they exit grinder mechanism 3 and enter intermediate chamber 5. Intermediate chamber 5, as seen for example in FIGS. 7A-7C, is formed in intermediate body 4 and includes an intermediate chamber aperture 7. Chamber 5 is primarily utilized to "catch" ground material, after it is ground in grinder mechanism 3, and then to deliver the ground material to one or more receptacle volumes, or to a storage delivery volume. In this regard, intermediate body 4 is rotatable about central axis 15 (see, e.g., FIGS. 1-2) so as to be able to align chamber aperture 7 with a selected receptacle volume or a storage delivery volume (as described more fully below). Chamber 5 preferably (but not necessarily) includes a sloped or angled "floor" or bottom surface 8 which is included and angled and/or otherwise configured to direct the flow of "caught" ground material to and towards intermediate chamber aperture 7.

In preferred embodiments, chamber aperture 7 has a diameter or opening size which is a fraction of the surface area of the floor or bottom surface of intermediate chamber 5. In particularly preferred (but still optional) embodiments, the aperture opening size is a size selected from between approximately ½0th to ¼ of the surface area of the chamber's floor or bottom surface. In particular, such a sized opening is selected so that a metered or otherwise limited or controlled amount or rate of ground material may be delivered by the chamber aperture 7 to a specifically selected volume of receptacle body 9. In the most preferred embodiments, aperture 7 opening is so sized and positioned such that it is similar to or closely matched to the size of upper receptacle volume apertures or openings within receptacle body 9. In such or other preferred (but still optional) embodiments, intermediate body 4 is rotatable relative to receptacle body 9 (either by detaching and rotating the body before reinstalling, or by rotating the body as assembled, such as about the axis of a centrally installed center pin) in order to match or align the location of chamber aperture 7 with a desired receptacle volume (e.g., one of volumes 11a-11f) of receptacle body 9. More specifically, by selectively aligning chamber aperture 7 with a chosen receptacle volume 11a-11f, ground material, such as ground tobacco, may be delivered directly from intermediate chamber 5 to the selected aperture volume (e.g., selected from volume 11a-11f).

In certain embodiments, in order to aid with alignment of chamber aperture 7 with a selected aperture volume 11a-11f and/or as an aid to maintaining such alignment, magnetic and/or magnetic/ferrous paired elements may be included at select locations on apparatus 1. More specifically, in the non-limiting example embodiments illustrated in FIGS. 7D and 8, magnets 25 and ferrous elements 27 are included positioned or located near or adjacent to receptacle volume apertures 11a-11f (see FIG. 8) and near or adjacent to chamber aperture 7 (see FIG. 7D). By including magnets and ferrous elements located as illustrated, when two magnets, as a defined pair, are aligned with two ferrous elements, as a defined pair, alignment of chamber aperture 7 with one of the six illustrated receptacle volumes 11a-11f is ensured. Moreover, because of the magnetic attraction of the magnets to the ferrous elements, the alignment of chamber aperture 7 to the selected receptacle volume is maintained until a sufficient, intentional "breaking force" is applied to break the magnetic attraction of the magnets/ferrous element pairs. Of course, instead of utilizing ferrous elements paired with magnets, magnets of opposite polarities may also be used to for the benefit of their attractive magnetic force to the opposing magnet of opposite polarity. Maintaining such alignment, of course, ensures that when ground material, such as ground tobacco, exits chamber aperture 7, the ground material is successfully delivered to a chosen or selected receptacle volume (e.g., one of volumes 11a-11f). Additional aids to alignment, or to maintaining alignment, such as mechanical piece interlocks may also be employed (alone or in combination with magnetic elements).

During operation of grinder apparatus 1, once tobacco or another material is loaded into the grinding chamber (i.e., the inner volume of grinder mechanism 3), a device user can select where, within the device, he/she wishes the resulting ground material to be delivered. For example, in the non-limiting embodiment of the invention which is illustrated, there are six different receptacle volumes housed within receptacle body 9. Five of these volumes, in the illustrated embodiment, are conical in configuration (see volumes 11a-11e) and are preferably (but not necessarily) provided with visual markings (e.g., Arabic or Roman numerals), so that the volume identity may be readily visually ascertained. Of course, other markings may be used to identify a volume, such as Braille-type markings, or no markings included at all. The sixth depicted volume, illustrated in the example embodiment as volume 11f (marked with the letter "E" in the drawings), is, however, not conical in configuration but instead comprises a simple cylinder with an open, rather than closed bottom. Employing the illustrated volume configurations, a user can load smoking paper, rolled into a conical configuration, into one or more of volumes 11a-11e prior to a grinding operation. Once loaded as such, a user of the device can choose to deliver ground material (such as ground tobacco) directly into a desired volume containing pre-loaded smoking paper. In this manner, a more efficient method of assembling custom smoking "cigarettes" is accomplished. Conversely, if the device user does not wish to assemble a "cigarette", or if there is excess ground material, the device user can select volume 11f as a delivery location, so that the ground tobacco or other material passes into the cylinder of volume 11f and then from the cylinder into storage chamber 17 of storage body 16. Selection of a delivery location for ground material is accomplished, of course, by simply rotating receptacle body 9 relative to intermediate body 4 to align chamber aperture 7 with the desired receptacle volume 11a-11f.

When utilizing grinding apparatus 1 to assemble custom cigarette-type smoking products, it may be desirable to tamp down or pack ground material into pre-loaded wrapping papers. Therefore, in certain optional embodiments, a tamping rod 29 is preferably included with the apparatus which may optionally be stored in aperture 28 located near or at the central axis of receptacle body 9. Other storage locations may of course be provided.

Note, while six receptacle volumes are illustrated and described in the present application, other numbers and configurations of receptacle volumes may be employed without departing from the scope of the subject invention. Moreover, the use of magnets/ferrous elements (or magnets of opposite polarity) to align chamber aperture 7 with a receptacle volume is optional, and alternative alignment mechanisms may, of course, be employed, or alignment aids may be eliminated all together.

In an alternative embodiment of a grinder apparatus disclosed in FIGS. 11-28, illustrated as grinder apparatus 101, additional utilitarian advantages are provided. For example, as shown in these figures, mechanically operated risers (or "elevators") 51 (see FIG. 23) are provided, which can be operated to lift already filled cones within their installed receptacles. This is so that the cones can be more conveniently and easily accessed and removed by a human user operating the apparatus. Apparatus 101, in this regard, is otherwise illustrated in these figures using like part numbers for like or similar features, but with a "'" symbol added to the common (or similar) part number(s) to distinguish apparatus 101 parts from the parts of grinder apparatus 1. For example, the grinder portion of apparatus 1 is labelled with number "3" but the grinder portion of grinder apparatus 101 is labeled 3'.

Figure 23:
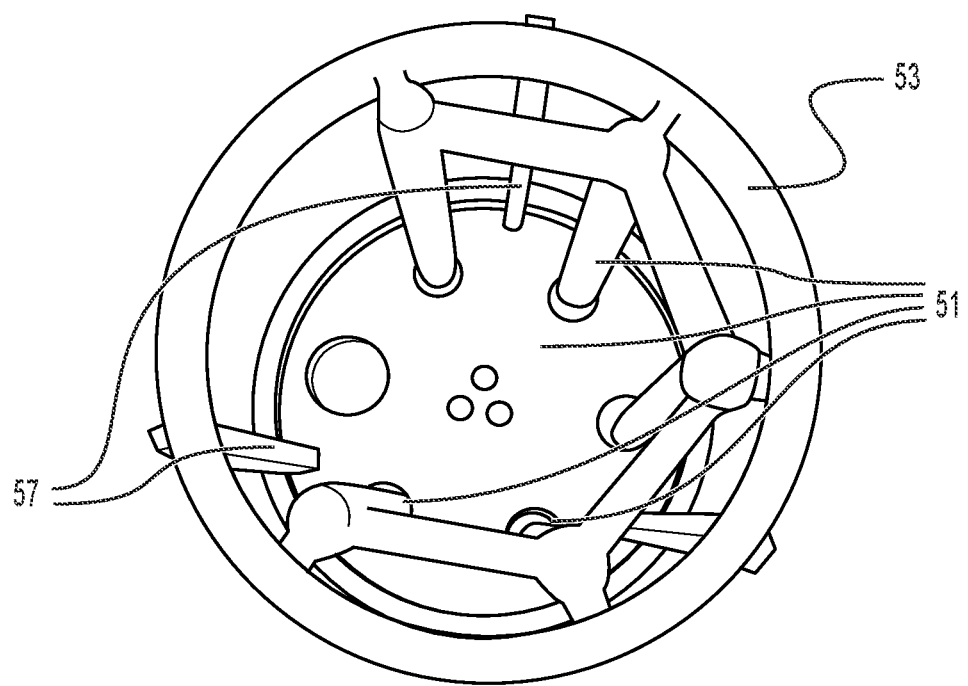
FIG. 23 is a view of the lifter ring mechanism of the grinding apparatus illustrated in FIG. 11.
Figure 24:
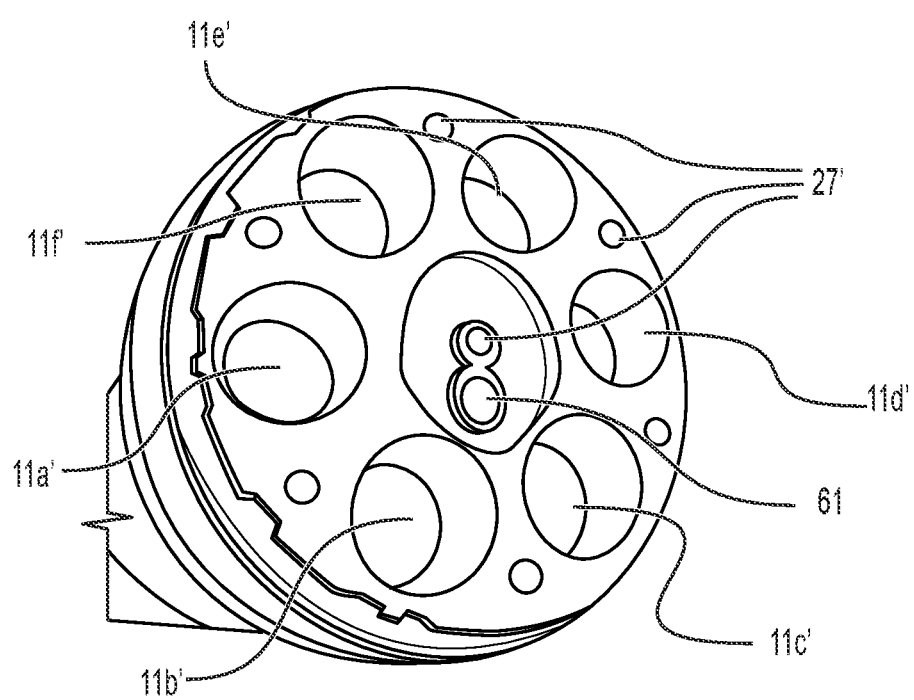
FIG. 24 is a view of the receptacle volumes of the grinding apparatus illustrated in FIG. 11.
Figure 25:
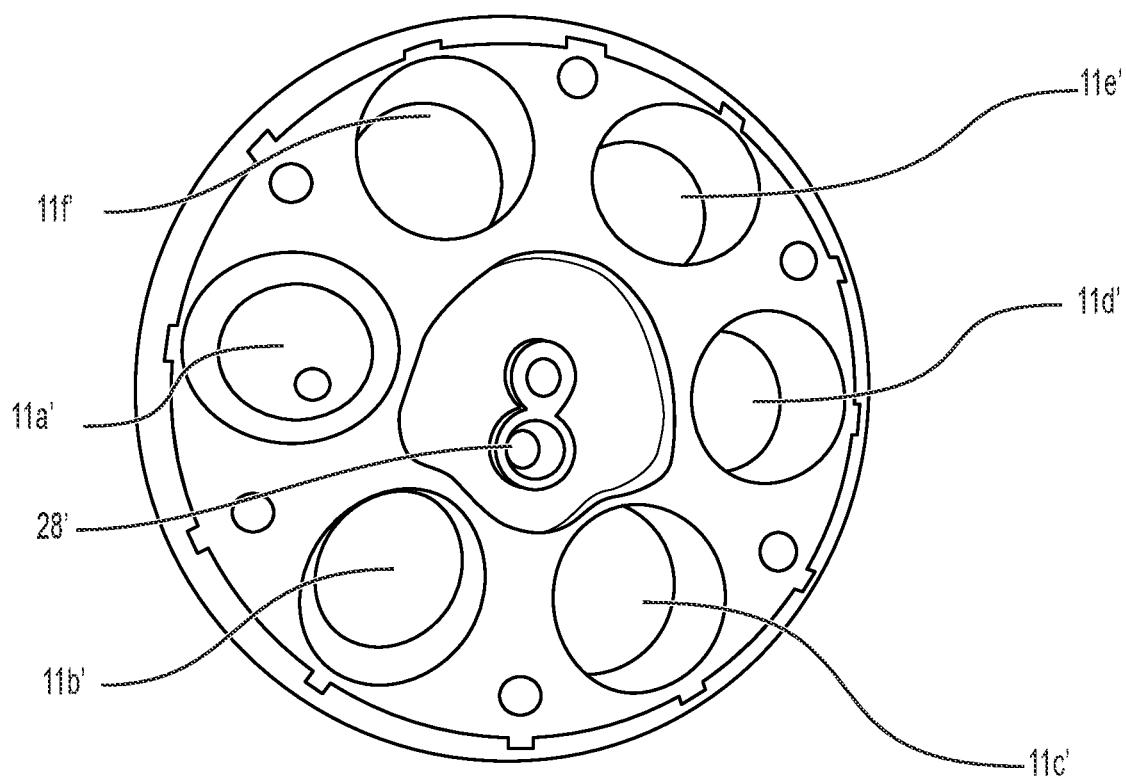
FIG. 25 is a second view of the receptacle volumes of the grinding apparatus illustrated in FIG. 11.
Figure 26:
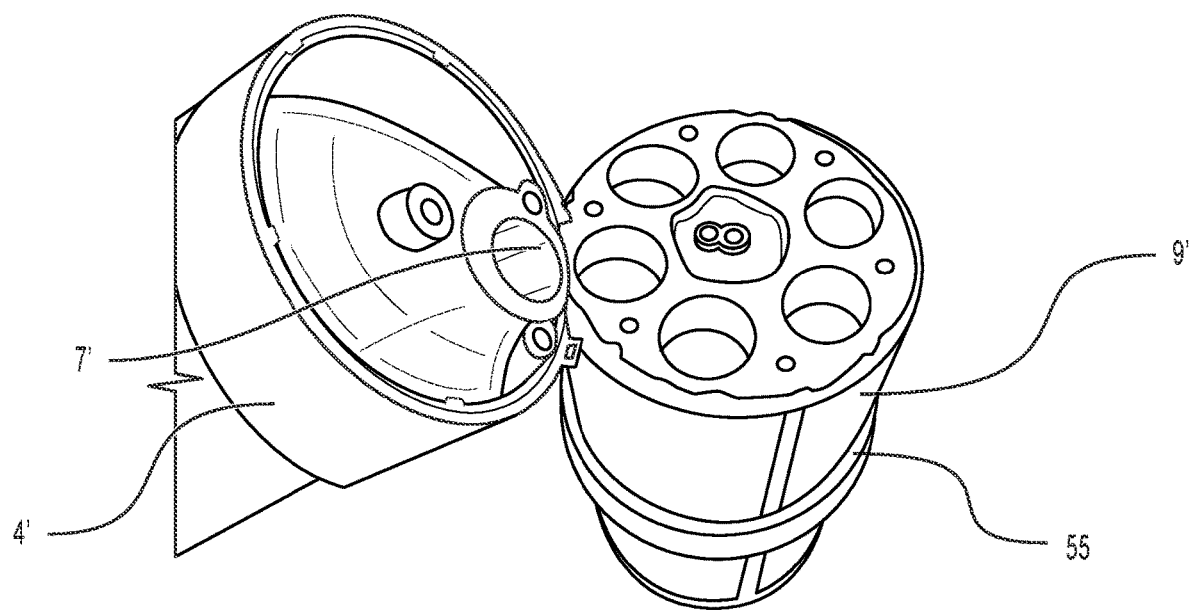
FIG. 26 is a perspective view of the grinding apparatus illustrated in FIG. 11 with the intermediate body and grinder mechanism removed.

As illustrated in these figures, and with particular initial focus on FIG. 23 and FIG. 26, both inner and outer lift rings 53 and 55, respectively, are provided in this embodiment (as a lift ring assembly) joined together by connecting arm structures 57 which extend vertically (to space the inner and outer rings vertically apart) and which pass through one or more slot-like apertures 59 in the cylindrical shell of the apparatus so that the outer ring can be articulated upwards and downwards while remaining connected to the inner ring. When articulated up and down, because the outer ring 55 is connected to the inner ring 53 with the connecting arm structures 57, the inner ring 53 is also articulated upwards and downwards. Furthermore, the inner ring is outfitted with an array of vertical lifting rods 51 (or elevators) each of which are mechanically connected within the circumference of the inner ring. Such vertical lifting rods 51 are optimally spatially arranged so that each rods aligns with an independent receptacle volume (one of 11a'-11f) so that the aligned rod can be moved upwards or downwards within the receptacle volume. Configured as such, when the plurality of receptacle volumes are pre-loaded with a plurality of cones, and the grinder is operated to fill such cones as described in the specification above, the cones can thereafter be lifted up within the receptacles using the lift ring structure accessible on the exterior of the grinder apparatus. That is, by manually mechanically raising the exterior lift ring structure 55, the inner ring 53 is also lifted (because it is connected to the exterior ring), as are the vertical lifting rods 51, each located below a cone within a respective receptacle. Accordingly, when the exterior lift ring structure is raised, the vertical lifting rods 51 each engage the bottom of a cone within their respective receptacle and raise the cone within the receptacle a distance which is commensurate with the raise distance of the exterior ring 55. Once raised as such, and with the grinder 3' and intermediate body removed 4', the cones are more easily accessed by a device user so that the upper portion of the cone may be physically grasped by a user so that it can be further lifted and ultimately removed from the respective receptacle. This feature is a significant advantage because it allows cones to be removed, while leaving the cones in a vertical orientation, so that ground material stored (or packaged) within the cones does not fall out of the top open end.

The specific lift ring assembly embodiment illustrated is particularly advantageous, but other physical and/or mechanical configurations for accomplishing the same functions are contemplated.

As a further advantage to the lift (or lifter) ring assembly, the outer ring 55 can be mechanically oscillated up and down rapidly manually by an apparatus user. If this is done when cones installed in the receptacle body are already filled, the up/down oscillating motion will cause the installed cones to move up/down (through their contact with the vertical lifting rods 51), and/or the vertical lifting rods 51 will repeatedly and rapidly tap the bottom of the cones to serve to pack ground material more densely into the cones. Alternatively, an automated oscillating or vibrating mechanism (e.g, 63 or 66 in FIG. 13) may be included with the device. For example, a vibration inducing mechanism (e.g., battery operated) can be installed connected to receptable body 9' (as unit 63 with switch 65), or even communicably connected to the inner lift ring so that, when it is operated to vibrate, the inner lift ring imparts vibration to the vertical lift rods which, in turn, impart vibration to the installed cones. This will also serve to pack the ground material more densely in the cones. In still another embodiment, an oscillating plate (or similar mechanical mechanism) can be installed below the inner lift ring so that when it is turned on (e.g. being a battery operated device), the inner lift ring is rapidly moved upwards or downwards by the oscillating plate to also serve to pack the ground material more densely in the cones. Afterwards, an optional tamping rod 61—which can be stored in an aperture 28' located proximal the middle of the receptacles—can be removed and used to manually "tamp" or pack the ground material even more densely into the cones.

In still another embodiment, a vibrating device 66 can be utilized installed in communication with the intermediate body so that, when operated (e.g., as a battery powered device with a switch 67), the vibration imparted to the intermediate body (e.g., the sloped or ramped surface 8' of the intermediate body 4') aids in moving or delivering ground material from the intermediate body, down the optional sloped surface towards the aperture provided for delivering ground material to the receptacles located in the receptacle body mounted below.

Figure 21:
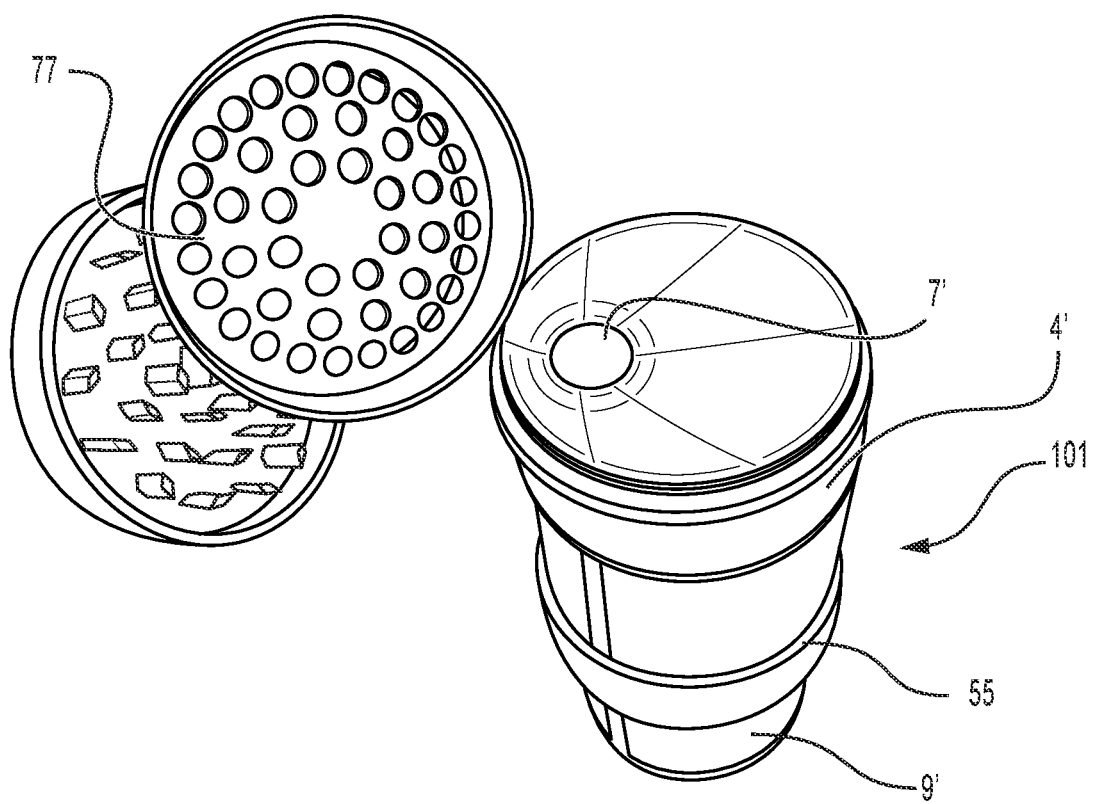
FIG. 21 is a perspective view of the grinding apparatus illustrated in FIG. 11, shown with an optional filter element.
Figure 22:
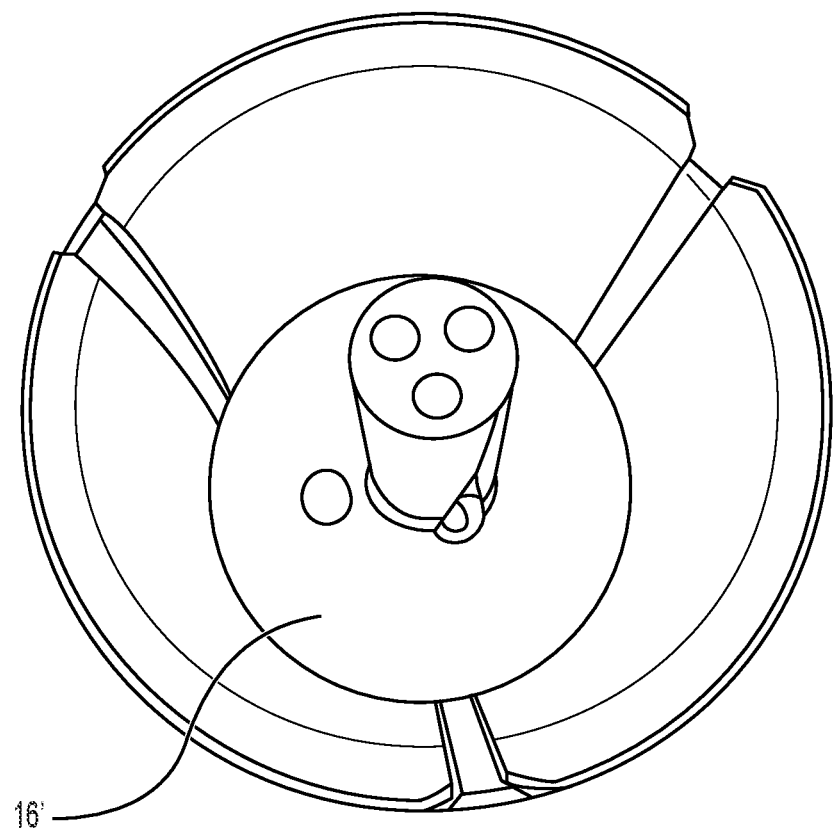
FIG. 22 is a view of the internal structure of the storage body of the grinder apparatus illustrated in FIG. 11.
Figure 27:
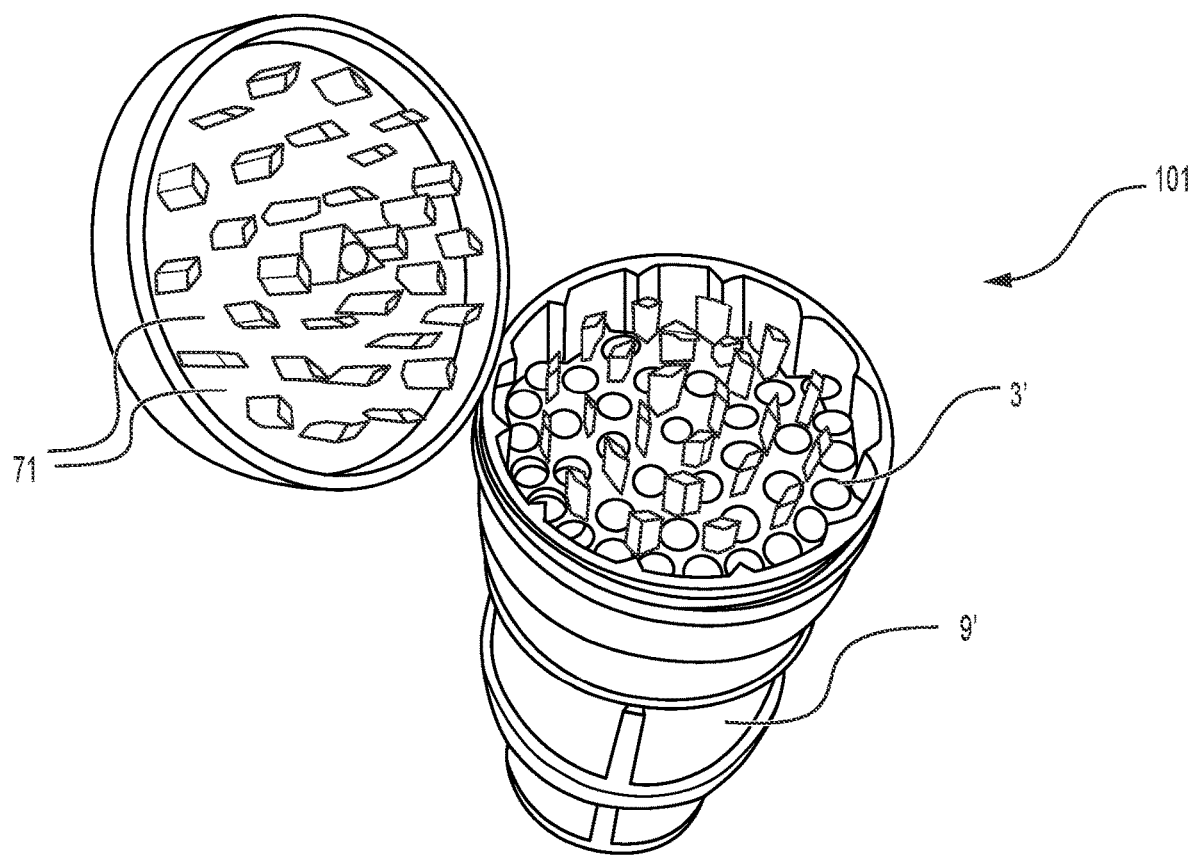
FIG. 27 is a perspective view of the grinding apparatus illustrated in FIG. 11 with the grinder mechanism shown opened.
Figure 28:
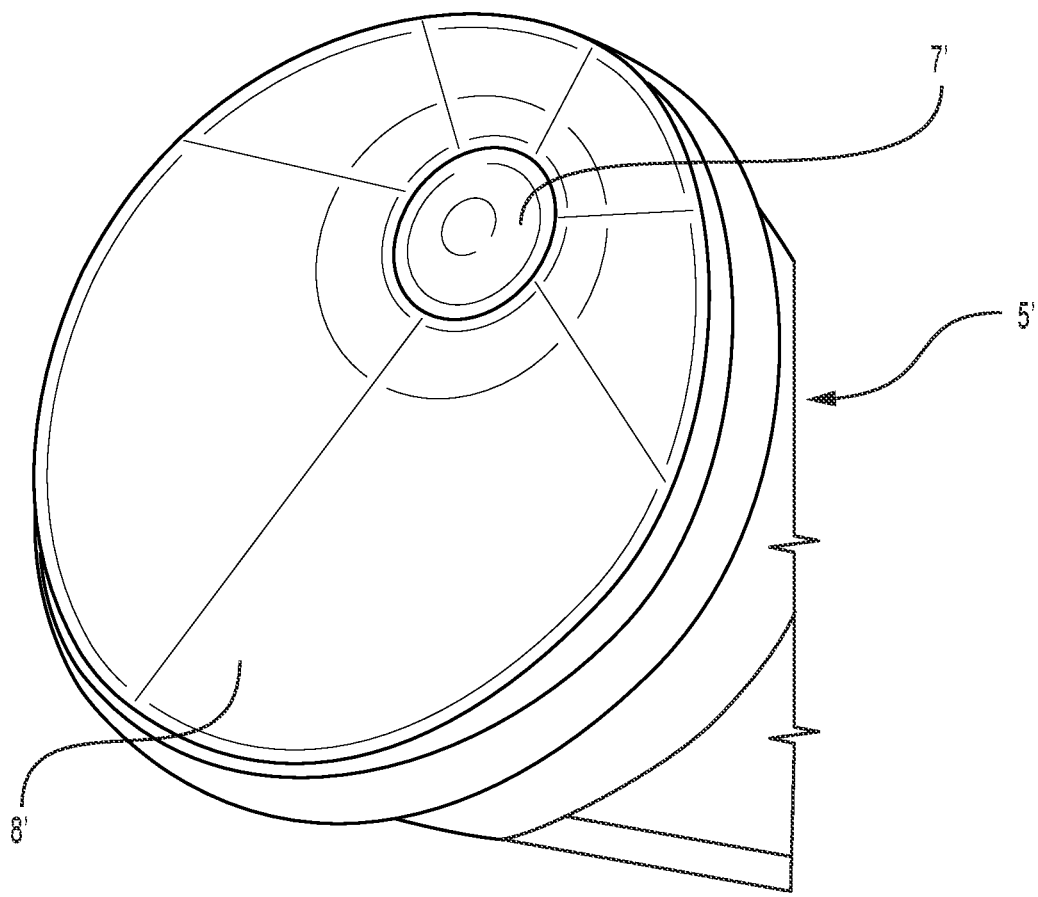
FIG. 28 is a view of the intermediate body of the grinding apparatus illustrated in FIG. 11.

As illustrated in FIGS. 21 and 27, this particular embodiment also includes improvements to the grinder mechanism. For example, the shape and arrangement of the grinder teeth 71 (e.g., as "diamond" shaped) has proven advantageous during operation of the grinding mechanisms. Furthermore, the peaks 73 repeatedly disposed along the inner circumferential wall of the lower grinder body half help immobilize material loaded into the grinder 3' so that when the grinder is operated (e.g., by rotating the upper half of the grinder back and forth relative to the lower grinder body half), the grinder teeth are able to grind or macerate the material (e.g., tobacco) more efficiently and/or thoroughly. This is because the material is more effectively immobilized (i.e., held in place, instead of moved around) against the action of the grinder teeth. As yet an additional option, filter 77 (see FIG. 21) can be installed between the grinding mechanism and intermediate body 4' so that only the desired size of material particles are delivered to the receptacles.

Once given the above disclosure, many other features, modifications, and improvements will become apparent to the skilled artisan. Such features, modifications, and improvements are therefore considered to be part of this invention, without limitation imposed by the example embodiments described herein. Moreover, any word, term, phrase, feature, example, embodiment, or part or combination thereof, as used to describe or exemplify embodiments herein, unless unequivocally set forth as expressly uniquely defined or otherwise unequivocally set forth as limiting, is not intended to impart a narrowing scope to the invention in contravention of the ordinary meaning of the claim terms by which the scope of the patent property rights shall otherwise be determined.

I claim:

1. Apparatus comprising:
   a grinding chamber, including a grinder mechanism, for grinding a grindable material;
   an intermediate chamber for receiving ground material which has been ground by said grinder mechanism, said intermediate chamber including an aperture for delivery of ground material from said intermediate chamber to a selected delivery location;

a plurality of receptacles for receiving ground material, ground by said grinder and contained within said intermediate chamber, each one of said plurality of receptacles defining a separate receptacle volume, each of said separate receptacle volumes each being separately, selectively alignable with said aperture of said intermediate chamber to thereby selectively receive ground material dispensed from said intermediate chamber; and a lifting ring assembly configured for lifting cones in said plurality of receptacles once they are filled with ground material.

2. Apparatus according to claim 1 wherein said plurality of receptacles are located spaced apart from one another, within a receptacle body, said receptacle body being rotatable about a central axis;

said intermediate chamber being located within an intermediate body, said intermediate body also being rotatable about said central axis; and wherein said intermediate body and said receptacle body are rotatable, about said central axis, with respect to one another thereby to selectively align one of said receptacle volumes with said aperture of said intermediate chamber to enable delivery of ground material from said intermediate chamber to said aligned receptacle volume via said aperture.

3. Apparatus according to claim 2 wherein said intermediate body has a top side and a bottom side;

said grinding chamber being so located at and connected to the top side of said intermediate body such that when said grinder mechanism is operated to grind grindable material, ground material delivers from said grinding chamber to said intermediate chamber; and said receptacle body being so located at and connected to said bottom side of said intermediate chamber, such that when said intermediate chamber contains ground material and said aperture of said intermediate chamber is aligned with a receptacle volume, ground material is delivered from said intermediate chamber to said aligned receptacle volume.

4. Apparatus according to claim 3 further including one or more magnetic elements and one or more ferrous elements, said magnetic and ferrous elements being so located and oriented such that attraction of said ferrous elements to said magnetic elements aids in aligning said aperture of said intermediate chamber to one or more of said plurality of receptacle volumes.

5. Apparatus according to claim 3 further including at least two spaced apart magnetic elements and at least two spaced apart ferrous elements, said magnetic and ferrous elements being located on opposite rotatable bodies selected from said intermediate body and said receptacle body, wherein when said at least two spaced apart magnetic elements are aligned with said at least two ferrous elements, as a result of rotation of said intermediate body relative to said receptacle body, said aperture of said intermediate body is aligned with a receptacle volume.

6. Apparatus comprising:

a grinding chamber, including a grinder mechanism, for grinding a grindable material;

an intermediate body rotatable about a central axis;

an intermediate chamber, located within said intermediate body, for receiving ground material which has been ground by said grinder mechanism, wherein the intermediate chamber includes a downwardly sloping bottom surface, for collecting and thereafter delivering received ground material, and a delivery aperture located proximal a bottom area of said downwardly sloping bottom surface, said delivery aperture being located offset from said central axis and configured and located to deliver ground material to a selected delivery location;

a receptacle body rotatable about said central axis;

a plurality of receptacles contained within said receptacle body for receiving ground material, ground by said grinder mechanism, each one of said plurality of receptacles defining a separate receptacle volume, each one of said plurality of separate receptacle volumes being located offset from said central axis, each one of said plurality of separate receptacle volumes being separately, selectively alignable with said delivery aperture to thereby selectively receive ground material dispensed from said intermediate chamber at a location offset from said central axis;

wherein said intermediate body and said receptacle body are so designed and assembled so as to be rotatable, about said central axis, with respect to one another thereby to selectively align one of said plurality of receptacle volumes with said delivery aperture of said intermediate body, at a location offset from said central axis, to enable delivery of ground material from said intermediate chamber to said aligned receptacle volume via said delivery aperture; and a lifting ring assembly configured for lifting cones in said plurality of receptacles once they are filled with ground material.

7. Apparatus according to claim 6 further including a storage chamber formed in a storage body, said storage body being located at and connected to said receptacle body; and a storage receptacle, contained within said receptacle body, said storage receptacle defining a separate storage receptacle volume having an opening at a bottom end thereof for ground material to pass through to be delivered to and stored within said storage chamber.

8. Apparatus according to claim 1 wherein said intermediate body has a top side and a bottom side;

said grinding chamber being so located at and connected to the top side of said intermediate body such that when said grinder mechanism is operated to grind grindable material, ground material delivers from said grinding chamber to said intermediate chamber; and said receptacle body being so located at and connected to said bottom side of said intermediate chamber, such that when said intermediate chamber contains ground material and said aperture of said intermediate chamber is aligned with one of said plurality of receptacle volumes, ground material is delivered from said intermediate chamber to said aligned receptacle volume.

9. Apparatus according to claim 1 including risers or elevators operable to oscillate up/down and/or to vibrate so that ground (or macerated) material loaded into the pre-installed cones settles more densely into the cone, prior to cone removal.

10. Apparatus according to claim 9 further including a storage chamber which is independently removeable and/or sealable.

11. Apparatus according to claim 1 wherein at least one of said receptacle volumes includes a bottom end which is at least substantially closed such that ground material may be retained, after grinding, in said receptacle volume.

12. Apparatus according to claim 1 wherein at least one of said receptacle volumes includes a wrapping paper in a cone or cylindrical form, nested within said at least one receptacle volume, for receipt of ground material ground by said grinder mechanism and delivered by said aperture of said intermediate chamber.

13. Apparatus according to claim 12 wherein at least one of said receptacle volumes is conical in configuration.

14. Apparatus according to claim 13 wherein said grinder mechanism is a manually operated grinder mechanism which grinds material located within said grinding chamber, when said grinder mechanism is operated by hand.

15. Apparatus according to claim 13 wherein said grinder mechanism is operated by a grinder motor, and wherein said grinder mechanism grinds material located within said grinding chamber, when said grinder motor is operated.

16. Apparatus according to claim 13 further including a removable tamping rod carried within a rod aperture.

17. Apparatus according to claim 13 wherein said grinding chamber is removably connected to said intermediate body;
said intermediate body is removably connected to said receptacle body; and
said receptacle body is removably connected to said storage body.

18. Apparatus according to claim 17 further including a vibration inducing mechanism which, when operated, induces vibration in at least said receptacle body and/or said intermediate body and/or in cones located in said receptacles.

19. Apparatus according to claim 18 wherein a provided vibration inducing mechanism aids in facilitating transmission of ground material from said intermediate chamber to at least one receptacle volume.

20. Apparatus according to claim 17 further including a storage chamber formed in a storage body, said storage body being located at and connected to said receptacle body; and
wherein at least one receptacle volume includes an opening at a bottom end thereof for ground material to pass through to be delivered to and stored within said storage chamber.

21. Apparatus according to claim 17 wherein at least one receptacle volume includes a bottom end which is at least substantially closed such that ground material may be retained, after grinding, in said receptacle volume.

22. Apparatus according to claim 21 wherein at least one receptacle volume includes a wrapping paper in a cone or cylindrical form, nested within said at least one receptacle volume, for receipt of ground material ground by said grinder mechanism and delivered by said aperture of said intermediate chamber.

23. Apparatus according to claim 1 wherein at least one receptacle volume is conical in configuration.

24. Apparatus according to claim 2 wherein said grinding chamber is removably connected to said intermediate body;
said intermediate body is removably connected to said receptacle body; and
said receptacle body is removably connected to said storage body.

25. Apparatus according to claim 24 wherein the grinding mechanism utilizes a plurality of diamond shaped teeth with peaks along the inner circumferential surface of the grinder body to restrict material movement within the grinder mechanism and with apertures in the grinder bottom.

* * * * *